United States Patent
Zhang et al.

(10) Patent No.: US 11,431,663 B2
(45) Date of Patent: Aug. 30, 2022

(54) TECHNOLOGIES FOR PREDICTING PERSONALIZED MESSAGE SEND TIMES

(71) Applicant: salesforce.com, inc., San Francisco, CA (US)

(72) Inventors: Yuxi Zhang, San Francisco, CA (US); Kexin Xie, San Mateo, CA (US)

(73) Assignee: SALESFORCE, INC., San Francisco, CA (US)

( * ) Notice: Subject to any disclaimer, the term of this patent is extended or adjusted under 35 U.S.C. 154(b) by 62 days.

(21) Appl. No.: 16/662,718

(22) Filed: Oct. 24, 2019

(65) Prior Publication Data
US 2021/0126885 A1 Apr. 29, 2021

(51) Int. Cl.
*G06F 15/16* (2006.01)
*H04L 51/18* (2022.01)
*G06F 17/16* (2006.01)
*G06N 20/00* (2019.01)
*H04L 51/42* (2022.01)

(52) U.S. Cl.
CPC .............. *H04L 51/18* (2013.01); *G06F 17/16* (2013.01); *G06N 20/00* (2019.01); *H04L 51/42* (2022.05)

(58) Field of Classification Search
CPC ......... H04L 51/18; H04L 51/22; G06N 20/00; G06F 17/16; G06F 20/00; G06F 21/6218; G06F 21/6245
USPC .................................................. 709/204–206
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

OTHER PUBLICATIONS

Bokde et al., "Matrix Factorization Model in Collaborative Filtering Algorithms: A Survey", Procedia Computer Science, 49, pp. 136-146. (Jan. 1, 2015).

(Continued)

*Primary Examiner* — Farzana B Huq
(74) *Attorney, Agent, or Firm* — Schwabe Williamson & Wyatt

(57) ABSTRACT

Disclosed embodiments are related to send time optimization technologies for sending messages to users. The send time optimization technologies provide personalized recommendations for sending messages to individual subscribers taking into account the delay and/or lag between the send time and the time when a subscriber engages with a sent message. A machine learning (ML) approach is used to predict the optimal send time to send messages to individual subscribers for improving message engagement. The personalized recommendations are based on unique characteristics of each user's engagement preferences and patterns, and deals with historical feedback that is generally incomplete and skewed towards a small set of send hours. The ML approach automatically discovers hidden factors underneath message and send time engagements. The ML model may be a two-layer non-linear matrix factorization model. Other embodiments may be described and/or claimed.

18 Claims, 6 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,940,394 B1 * | 4/2018 | Grant .................... H04L 51/08 |
| 10,692,114 B1 * | 6/2020 | Andersen ........... G06Q 30/0249 |
| 10,826,852 B2 | 11/2020 | Jin et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |

(56) References Cited

U.S. PATENT DOCUMENTS

| | | |
|---|---|---|
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2013/0325755 A1* | 12/2013 | Arquette .......... H04L 51/32 706/12 |
| 2014/0122622 A1* | 5/2014 | Castera .......... H04L 51/04 709/206 |
| 2014/0359537 A1 | 12/2014 | Jackobson et al. |
| 2015/0195216 A1* | 7/2015 | Di Pietro .......... H04L 45/02 370/252 |
| 2017/0134474 A1* | 5/2017 | Gao .......... H04L 67/325 |
| 2018/0157971 A1* | 6/2018 | Fusi .......... G06N 7/005 |
| 2019/0102670 A1* | 4/2019 | Ceulemans .......... G06F 21/6218 |
| 2019/0163718 A1* | 5/2019 | Borje .......... G06Q 10/04 |
| 2019/0213476 A1* | 7/2019 | Singh .......... G06N 3/0445 |
| 2019/0362016 A1 | 11/2019 | Xie et al. |
| 2019/0362017 A1 | 11/2019 | Salomon et al. |
| 2019/0362018 A1 | 11/2019 | Salomon et al. |
| 2020/0104408 A1 | 4/2020 | Salomon et al. |
| 2020/0252205 A1* | 8/2020 | Padmanabhan .......... H04L 9/0643 |
| 2020/0301966 A1 | 9/2020 | Burke et al. |
| 2020/0322307 A1 | 10/2020 | Zhang et al. |

OTHER PUBLICATIONS

Flenner et al., "A Deep Non-Negative Matrix Factorization Neural Network." Semantic Scholar (2017).

Haque et al., "Divergence based non-negative matrix factorization for top-n recommendations", Proceedings of the 52nd Hawaii International Conference on System Sciences (Jan. 8, 2019).

Lawrence et al., "Non-Linear Matrix Factorization with Gaussian Process", Proceedings of the 26th annual International Conference on Machine Learning, pp. 601-608 (Jun. 14, 2009).

Lawrence et al., "Non-linear Matrix Factorization", Learning Workshop Snowbird, Clearwater FL (Apr. 2009).

Lee et al., "Algorithms for Non-negative Matrix Factorization", Advances in Neural Information Processing Systems, MIT Press, pp. 556-562 (2001).

Minih et al., "Probabilistic Matrix Factorization", Advances in Neural Information Processing Systems, pp. 1257-1264 (2008).

Song, "A Non-Negative Matrix Factorization for Recommender Systems Based on Dynamic Bias", Modeling Decisions for Artificial Intelligence, pp. 151-163 (Jul. 2019).

* cited by examiner

TECHNOLOGIES FOR PREDICTING PERSONALIZED MESSAGE SEND TIMES

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to database management systems and cloud computing systems, and in particular to systems and methods for predicting times for sending messages to individual subscribers to improve subscriber engagement with such messages.

BACKGROUND

Some cloud computing systems provide messaging services, which allow their customers organizations (orgs) to send messages to their subscribers, and to track subscriber engagement with the sent messages. Usually, customers orgs design their messages to achieve high impact on user engagement. In this context, engagement refers to a user opening a message and/or interacting with the content within the message. Most customer orgs send their messages whenever they have content to send out, or based on a 'gut feeling' of when their customers are likely to engage with the content of their messages. Because most customer orgs wish to send messages to a high volume of subscribers (e.g., sometimes in the millions), one issue with this approach to sending messages is that it can be computationally burdensome to transmit such a large number of messages at the same (or almost the same) time. Additionally, sending such high volumes of messages at once can be costly in terms of network resource overhead.

Some customer orgs use send time optimization tools provided by the cloud computing service or provided by a third party developer. Existing send optimization tools include global level recommendation tools and A/B testing tools (also known as "split-run testing" or "bucket testing"). The global level recommendation tools mainly focus on finding historical trends or predicting when users are actively engaged with their email client, which does not necessarily solve the problem of when to send emails to those users. Such solutions make a strong assumption that the best time to send email is when users open them, which is not necessarily true for all users. Additionally, these solutions usually involve pooling data across enterprises, which cause imbalanced model accuracy. A/B testing tools require manual effort to split the subscribers for randomized experiments, and such solutions generally take at least a few days to obtain meaningful results. Existing send time optimization tools do not account for the delay/lag between the send time and the time when a subscriber engages with the message (e.g., an open time or the like), and lack personalized recommendations for individual subscribers. However, existing send time optimization tools are not based on individual subscribers or even based on specific demographic audiences.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
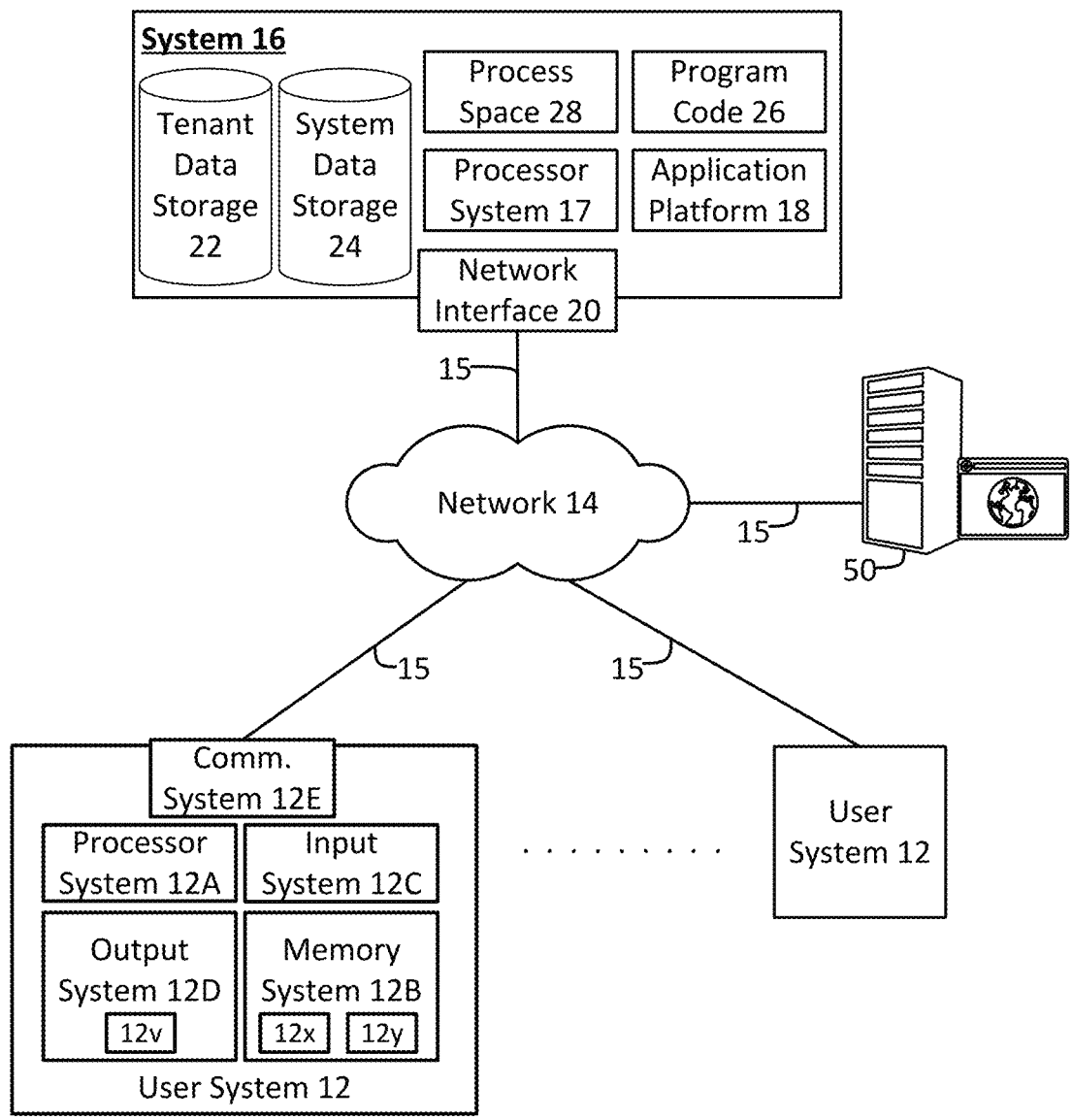
FIG. 1A shows an example environment in which an on-demand database service can be used according to various embodiments.

Disclosed embodiments are related to send time optimization mechanisms that predict send times for sending messages to individual subscribers to improve subscriber engagement with such messages. In embodiments, a cloud computing system includes messaging services that allow customer platforms to send messages to their subscribers, and to track subscriber engagement with the sent messages. The messaging services also include send timing services, which allow the customer platforms to set a time and date to send messages to their subscribers. The send timing service may also be referred to as "delayed delivery" or the like. According to various embodiments, the cloud computing system also provides a send time optimization tool that allows customer platforms to predict a best or optimal send time to send messages to individual subscribers. The send time optimization tool may interact with the send timing service to set the optimal time/date for sending messages to individual subscribers.

The send time optimization tool accounts for the delay and/or lag between the send time and the time when a subscriber engages with the message (e.g., a time when the subscriber opens the message and/or interacts with the message content), and provides personalized recommendations for sending messages for individual subscribers. In various embodiments, a machine learning (ML) approach is used to predict the best send time to send individual messages to individual subscribers for improving message engagement. This approach automatically discovers hidden factors underneath message and send time engagements/interactions, and leverages crowd opinion for subscribers that do not have sufficient data. The ML model makes personalized recommendations based on the unique characteristics of each user's engagement preferences and patterns, accounts for the time between the send time and open time, which typically varies from subscriber to subscriber, and deals with historical feedback that is generally incomplete and skewed towards a small set of send hours. In embodiments, the ML model is a two-layer non-negative matrix factorization model. Other embodiments may be described and/or disclosed.

As alluded to previously, sending a large amount of messages without send time optimization can be computationally intensive and can consume large amounts of computing and network resources, at least from the perspective of the cloud computing system. The send time optimization embodiments described by the present disclosure level or smooth out resource consumption by scheduling and sending messages at different times and dates, based on predicted optimal engagements of individual subscribers. The send time optimization embodiments are a technological improvement in that the embodiments allow cloud computing systems to reduce network and computing resource overhead associated with generating and sending messages to subscribers on behalf of customer organizations. The send time optimization embodiments also reduce network and computing resource overhead of customer organizations' platforms by reducing the amount of content generated and sent to subscribers that is not consumed by the subscribers. Additionally, the solutions described herein conserves network resources at subscriber devices by reducing or eliminating the need for using network resources associated with receiving unwanted messages, and also conserves computing resources at subscriber devices by reducing or eliminating the need to implement spam filters and the like and/or reducing the amount of data to be processed when analyzing and/or deleting such messages. Using conventional send time optimization tools may help reduce resource consumption/overhead in comparison to not using send time optimization tools at all. However, the conventional send time optimization tools do not predict optimal engagement times as well as the embodiments described herein, and therefore, the send time optimization embodiments further reduce resource consumption/overhead as compared to the conventional send time optimization tools.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods includes more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Example embodiments of the present disclosure may be described in terms of a multitenant and/or cloud computing architecture or platform. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Multi-tenancy is a feature of cloud computing where physical or virtual resources are allocated in such a way that multiple tenants and their computations and data are isolated from and inaccessible to one another. As used herein, the term "tenant" refers to a group of users (e.g., cloud service users) who share common access with specific privileges to a software instance and/or a set of computing resources. Tenants may be individuals, organizations, or enterprises that are customers or users of a cloud computing service or platform. However, a given cloud service customer organization could have many different tenancies with a single cloud service provider representing different groups within the organization. A multi-tenant platform or architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, Inc. of San Francisco, Calif. salesforce.com, Inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, Inc. and can be implemented in the context of various other database systems such as cloud-based systems that are not part of a multi-tenant database system or which do not provide enterprise social networking services.

I. Example System Overview

FIG. 1A shows an example of an environment 10 in which on-demand services (e.g., cloud computing services and/or database services) can be used in accordance with various embodiments. The environment 10 includes user systems 12, a network 14, system 16 (also referred to herein as a "cloud-based system," "database system," "cloud computing service," or the like), and customer platform (CP) 50. The cloud system 16 includes a processor system 17, an application platform 18, a network interface 20, tenant database (DB) 22 for storing tenant data 23 (see e.g., FIG. 1B), system DB 24 for storing system data 25 (see FIG. 1B), program code 26 for implementing various functions of the system 16, and process space 28 for executing DB system processes and tenant-specific processes, such as running applications as part of an application hosting service. In some other implementations, environment 10 may not have all of these components or systems, or may have other components or systems instead of, or in addition to, those listed above.

Figure 1B:
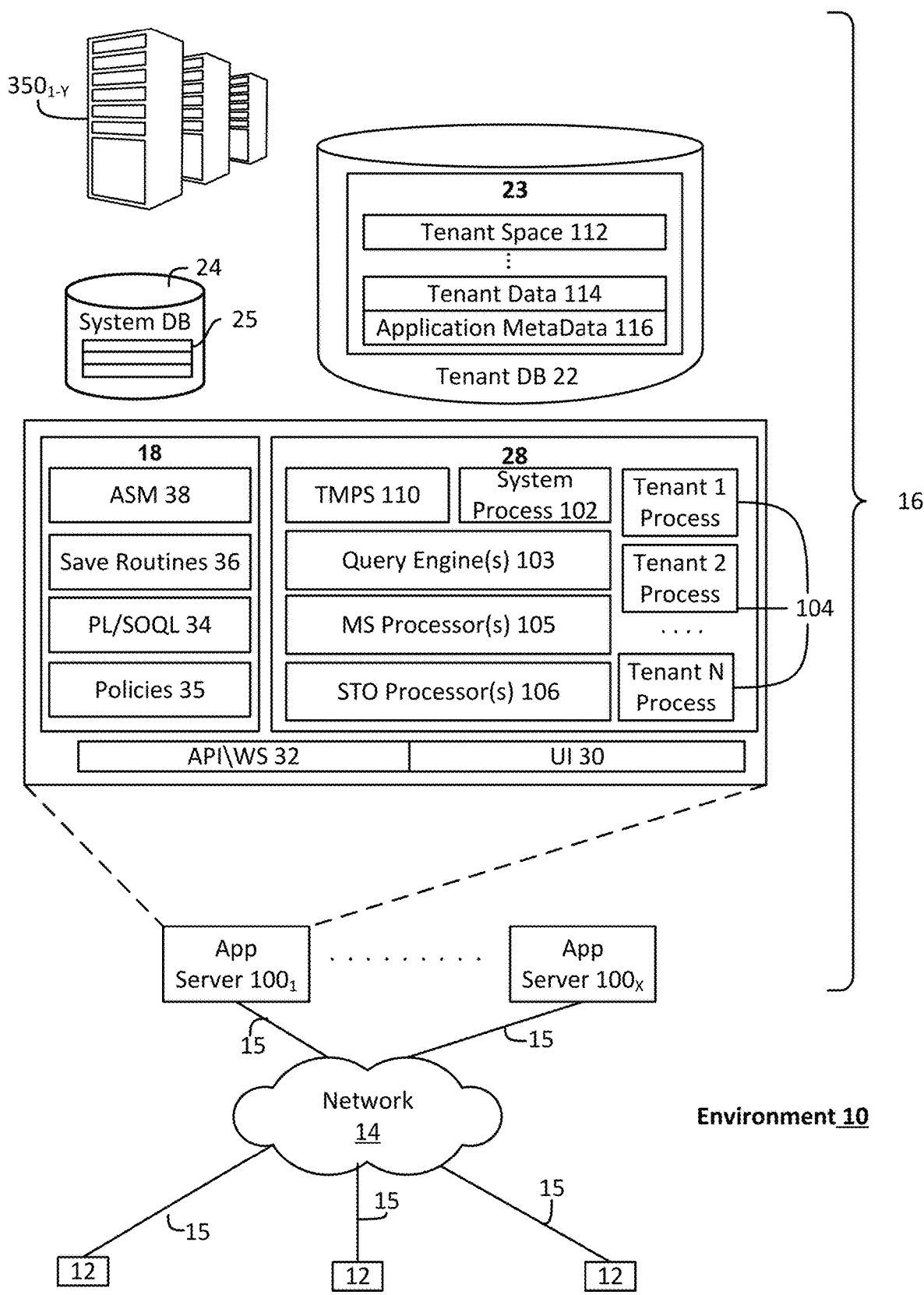
FIG. 1B shows an example implementation of elements of FIG. 1A and example interconnections between these elements according to various embodiments.

The system 16 may be a DB system and/or a cloud computing service comprising a network or other interconnection of computing systems (e.g., servers, storage devices, applications, etc., such as those discussed with regard to FIGS. 1A-1B infra) that provides access to a pool of physical and/or virtual resources. In some implementations, the system 16 is a multi-tenant DB system and/or a multi-tenant cloud computing platform. In some implementations, the system 16 provides a Communications as a Service (CaaS), Compute as a Service (CompaaS), Database as a Service (DaaS), Data Storage as a Service (DSaaS), Firewall as a Service (FaaS), Infrastructure as a Service (IaaS), Network as a Service (NaaS), Platform as a Service (PaaS), Security as a Service, Software as a Service (SaaS), and/or other like cloud services.

In some implementations, the environment 10 is an environment in which an on-demand DB service exists. An on-demand DB service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand DB services can store information from one or more tenants into tables of a common DB image to form a multi-tenant DB system (MTS). The term "multi-tenant DB system" can refer to those systems in which various elements of hardware and software of a DB system may be shared by one or more customers or tenants. For example, a given application server may simultaneously process requests for a great number of customers, and a given DB table may store rows of data such as feed items for a potentially much greater number of customers. A DB image can include one or more DB objects. A relational DB management system (RDBMS) or the equivalent can execute storage and retrieval of information against the DB object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand DB service, users accessing the on-demand DB service via user systems 12, or third party application developers accessing the on-demand DB service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a DB system related data, objects, and web page content. In some MTS implementations, data for multiple tenants may be stored in the same physical DB object in tenant DB 22. In some such implementations, tenant data is arranged in the storage medium(s) of tenant DB 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more DB objects and the execution of the applications in one or more virtual machines in the process space of the system 16. In some embodiments, the process space of the system 16 may be divided into isolated user-space instances using suitable OS-level virtualization technology such as containers (e.g., Docker® containers, Kubernetes® containers, Solaris® containers, etc.), partitions, virtual environments (VEs) (e.g., OpenVZ® virtual private servers, etc.), and/or the like. The applications of the application platform 18 may be developed with any suitable programming languages and/or development tools, such as those discussed herein. The applications may be built using a platform-specific and/or proprietary development tool and/or programming languages, such as those discussed herein.

In embodiments, the tenant data storage 22, the system data storage 24, and/or some other data store (not shown) include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or DB, and, in some instances, a DB application (e.g., OODBMS or RDBMS) as is well known in the art. It should also be understood that "server system" and "server" are often used interchangeably herein. Similarly, the DB objects (DBOs) described herein can be implemented as part of a single DB, a distributed DB, a collection of distributed DBs, a DB with redundant online or offline backups or other redundancies, etc., and can include a distributed DB or storage network and associated processing intelligence.

The network 14 can be or include any network or combination of networks of systems or devices that communicate with one another. For example, the network 14 can be or include any one or any combination of a local area network (LAN), a wireless LAN (WLAN), wide area network (WAN), telephone network, wireless network, cellular network, point-to-point network, star network, token ring network, hub network, or other appropriate configuration including proprietary and/or enterprise networks, or combinations thereof. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, (macro or small-cell) base stations, servers (e.g., stand-alone, rack-mounted, blade, etc.), and/or any other like devices/systems. Connection to the network 14 may be via a wired or a wireless connection using one or more of the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines which enable, for example, the seven layers of the open systems interconnection (OSI) model of computer networking or equivalent in a wireless network.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Internet Protocol (IP), Internet Protocol Security (IPsec), Session Initiation Protocol (SIP) with Real-Time Transport Protocol (RTP or Secure RTP (SRTP), Internet Control Message Protocol (ICMP), User Datagram Protocol (UDP), QUIC (sometimes referred to as "Quick UDP Internet Connections"), Stream Control Transmission Protocol (SCTP), Web-based secure shell (SSH), Extensible Messaging and Presence Protocol (XMPP), WebSocket protocol, Internet Group Management Protocol (IGMP), Internet Control Message Protocol (ICMP), etc. In an example where HTTP is used, each user system 12 can include an HTTP client commonly referred to as a "web browser" or simply a "browser" for sending and receiving HTTP signals to and from an HTTP server (also referred to as a "web server") of the system 16. In this example, each user system 12 may send and receive HTTP messages where a header of each message includes various operating parameters and the body of the such messages may include code or source code documents (e.g., HTML, XML, JSON, Apex®, CSS, JSP, MessagePack™, Apache® Thrift™, ASN.1, Google® Protocol Buffers (protobuf), DBOs, or some other like object(s)/document(s)). Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the system 16. For example, any of user systems 12 can be a desktop computer, a work station, a laptop computer, a tablet computer, a handheld computing device (e.g., Personal Data Assistants (PDAs), pagers, portable media player, etc.), a mobile cellular phone (e.g., a "smartphone"), or any other WiFi-enabled device, WAP-enabled device, or other computing device capable of interfacing directly or indirectly to the Internet or other network (e.g., network 14). The terms "user system", "computing device", "computer system", or the like may be used interchangeably herein with one another and with the term "computer."

As shown by FIG. 1A, the user system 12 includes a processor system 12A, which can include any suitable combination of one or more processors, such as one or more central processing units (CPUs) including single-core or multi-core processors (such as those discussed herein), graphics processing units (GPUs), reduced instruction set computing (RISC) processors, Acorn RISC Machine (ARM) processors, complex instruction set computing (CISC) processors, digital signal processors (DSP), programmable logic devices (PLDs), field-programmable gate arrays (FPGAs), Application Specific Integrated Circuits (ASICs), System-on-Chips (SoCs) and/or programmable SoCs, microprocessors or controllers, or any other electronic circuitry capable of executing program code and/or software modules to perform arithmetic, logical, and/or input/output operations, or any suitable combination thereof. As examples, the processor system 12A may include Intel® Pentium® or Core™ based processor(s); AMD Zen® Core Architecture processor(s), such as Ryzen® processor(s) or Accelerated Processing Units (APUs), MxGPUs, or the like; A, S, W, and T series processor(s) from Apple® Inc.; Snapdragon™ processor(s) from Qualcomm® Technologies, Inc., Texas Instruments, Inc.® Open Multimedia Applications Platform (OMAP)™ processor(s); MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; GeForce®, Tegra®, Titan X®, Tesla®, Shield®, and/or other like GPUs provided by Nvidia®; and/or the like.

The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The memory system 12B may store program code for various applications (e.g., application 12y and/or other applications discussed herein) for carrying out the procedures, processes, methods, etc. of the embodiments discussed herein, as well as an operating system (OS) 12x and one or more DBs or DBOs (not shown).

The application(s) 12y is/are a software application designed to run on the user system 12 and is used to access data stored by the system 16. The application 12y may be platform-specific, such as when the user system 12 is implemented in a mobile device, such as a smartphone, tablet computer, and the like. The application 12y may be a native application, a web application, or a hybrid application (or variants thereof). One such application 12y may be the previously discussed HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, to execute and render web applications allowing a user (e.g., a subscriber of on-demand services provided by the system 16) of the user system 12 to access, process and view information, pages, interfaces (e.g., UI 30 in FIG. 1B), and application(s) 12y available to it from the system 16 over the network 14. In other implementations, each user system 12 may operate a web or user application 12y designed to interact with applications of the application platform 18 allowing a user (e.g., a subscriber of on-demand services provided by the system 16) of the user system 12 to access, process and view information, pages, interfaces (e.g., UI 30 in FIG. 1B), and applications 12y available to it from the system 16 over the network 14. In some cases, an owner/operator of system 16 may have pre-built the web or user applications 12y for use by clients, customers, and/or agents of a tenant organization (org) to access a tenant space or enterprise social network of that tenant org. In some cases, developers associated with a tenant org (e.g., CP 50) may build custom application(s) for interacting with the tenant data. The user (or third party) application(s) may be native application(s) (e.g., executed and rendered in a container) or hybrid application(s) (e.g., web applications being executed/rendered in a container or skeleton). The user (or third party) application(s) may be platform-specific, or developed to operate on a particular type of user system 12 or a particular (hardware and/or software) configuration of a user system 12. The term "platform-specific" may refer to the platform implemented by the user system 12, the platform implemented by the system 16, and/or a platform of a third party system/platform. The web, user, or third party application(s) 12y discussed herein may be a software, program code, logic modules, application packages, etc. that are built using one or more programming languages and/or development tools, such as those discussed herein. Furthermore, such applications may utilize a suitable querying language to query and store information in an associated tenant space, such as, for example, the various query languages discussed herein or the like. The application 12y may be developed using any suitable programming language and/or development tools such as any of those discussed herein. In some implementations, the application 12y may be developed using platform-specific development tools and/or programming languages such as those discussed herein.

In an example, the user systems 12 may implement web, user, or third party applications 12y to request and obtain data from system 16, and render graphical user interfaces (GUIs) in an application container or browser. These GUIs may correspond with GUI 12v and/or UI 30 shown and described with respect to FIG. 1B. In some implementations, the GUIs may include a data analytics GUI, such as Salesforce® Wave™ dashboard, which may provide visual representations of data (also referred to as visual representations 12v or the like) residing in an enterprise cloud or in an on-demand services environment (e.g., a tenant space within system 16). The GUIs may include one or more components (e.g., graphical control elements (GCEs), tabs, reports, dashboards, widgets, pages, etc.). Examples of such components may include audio/video calling components, messaging components (e.g., chat, instant messaging, short message service (SMS)/multimedia messaging service (MMS) messaging, emailing, etc.), and visualization components. The visualization components may enable a user of a user system 12 to select visualization parameters (also referred to as "lens parameters" or "filters") for displaying data from one or more datasets. A dataset may be a specific view or transformation of data from one or more data sources (e.g., a tenant space of DB 22, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within a particular GUI, etc. The graphs/charts/maps to be displayed may be referred to as a "lens" or a "dashboard". A lens may be a particular view of data from one or more datasets, and a dashboard may be a collection of lenses. In some implementations, a GUI may display lenses, dashboards, and/or control panels to alter or rearrange the lenses/dashboards. Furthermore, the various application(s) discussed herein may also enable the user system 12 to provide authentication credentials (e.g., user identifier (user_id), password, personal identification number (PIN), digital certificates, etc.) to the system 16 so that the system 16 may authenticate the identity of a user of the user system 12.

Each user system 12 typically includes an operating system (OS) 12x to manage computer hardware and software resources, and provide common services for various applications 12y. The OS 12x includes one or more drivers and/or APIs that provide an interface to hardware devices thereby enabling the OS 12x and applications to access hardware functions. The OS 12x includes middleware that connects two or more separate applications or connects applications 12y with underlying hardware components beyond those available from the drivers/APIs of the OS 12x. The OS 12x may be a general purpose OS or a platform-specific OS specifically written for and tailored to the user system 12.

The input system 12C can include any suitable combination of input devices, such as touchscreen interfaces, touchpad interfaces, keyboards, mice, trackballs, scanners, cameras, a pen or stylus or the like, or interfaces to networks. The input devices of input system 12C may be used for interacting with a GUI provided by the browser/application container on a display of output system 12D (e.g., a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. The output system 12D can include any suitable combination of output devices, such as one or more display devices, printers, or interfaces to networks. The output system 12D is used to display visual representations and/or GUIs 12v based on various user interactions. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The communications system 12E may include circuitry for communicating with a wireless network or wired network. Communications system 12E may be used to establish a link 15 (also referred to as "channel 15," 'networking layer tunnel 15,' and the like) through which the user system 12 may communicate with the system 16. Communications system 12E may include one or more processors (e.g., baseband processors, network interface controllers, etc.) that are dedicated to a particular wireless communication protocol (e.g., WiFi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches; filters; amplifiers; antenna elements; wires, ports/receptacles/jacks/sockets, and plugs; and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the system 16, the user system 12 using the communications system 12E may establish link 15 with network interface 20 of the system 16.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and DB information accessible by a lower permission level user, but may not have access to certain applications, DB information, and data accessible by a user at a higher permission level. Thus, different users generally will have different capabilities with regard to accessing and modifying application and DB information, depending on the users' respective security or permission levels (also referred to as "authorizations").

According to some implementations, each user system 12 and some or all of its components are operator-configurable using applications, such as a browser, including computer code executed using one or more central processing units (CPUs) and/or other like computer processing devices (e.g., processor system 12B). Similarly, the system 16 (and additional instances of an MTS, where more than one is present) and all of its components can be operator-configurable using application(s) including computer code to run using the processor system 17, which may include one or more CPUs/processors. Examples of the processors/CPUs of processor system 17 may include one or multiple Intel Pentium® or Xeon® processors, Advanced Micro Devices (AMD) Zen® Core Architecture processor(s), such as Ryzen® or Epyc® processor(s), Accelerated Processing Units (APUs), MxGPUs, or the like; ARM-based processor(s) licensed from ARM Holdings, Ltd. such as the ARM Cortex-A family of processors and the ThunderX2® provided by Cavium™, Inc.; Centrig™ processor(s) from Qualcomm® Technologies, Inc.; Power Architecture processor(s) provided by the OpenPOWER® Foundation and/ or IBM®; GeForce®, Tegra®, Titan X®, Tesla®, Shield®, and/or other like GPUs provided by Nvidia®; a MIPS-based design from MIPS Technologies, Inc. such as MIPS Warrior P-class processors; and/or the like, or the like.

The system 16 includes tangible computer-readable media having non-transitory instructions stored thereon/in that are executable by or used to program a server (e.g., the app servers 100 or other servers discussed herein) or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

The CP 50 includes one or more physical and/or virtualized systems for providing content and/or functionality (i.e., services) to one or more clients (e.g., user system 12) over a network (e.g., network 14). The physical and/or virtualized systems include one or more logically or physically connected servers and/or data storage devices distributed locally or across one or more geographic locations. Generally, the CP 50 is configured to use IP/network resources to provide web pages, forms, applications, data, services, and/or media content to different user system 12. As examples, the CP 50 may provide search engine services; social networking and/or microblogging services; content (media) streaming services; e-commerce services; communication services such as Voice-over-Internet Protocol (VoIP) sessions, text messaging, group communication sessions, and the like; immersive gaming experiences; and/or other like services. The user systems 12 that utilize services provided by CP 50 may be referred to as "subscribers" of CP 50 or the like. Although FIG. 1A shows only a single CP 50, the CP 50 may represent multiple individual CPs 50, each of which may have their own subscribing user systems 12.

CP 50 (also referred to as a "service provider platform", "tenant", "tenant organization", or the like) may be a customer or tenant of the system 16 that develops applications that interact and/or integrate with the system 16 and utilize data from an associated tenant space in tenant DB 22; these applications may be referred to as "customer apps," "CP apps," or the like. The term "customer platform" or "CP" as used herein may refer to both the platform and/or applications themselves, as well as the owners, operators, and/or developers associated with the customer platform. The CP apps may obtain data from the associated tenant space to render/display visual representations of relevant tenant data. In some cases, the CP apps utilize tenant data for interacting with user systems 12 by, for example, sending messages to various user systems 12 (e.g., subscribers of the CP 50) via the system 16. To do so, the CP apps include program code or script(s) that call an API/WS 32 (see e.g., FIG. 1B) to create and execute the sending of these messages based on predefined events/conditions and/or triggering events. As discussed in more detail infra, the CP apps include program code/scripts that call APIs/WS 32 (see e.g., FIG. 1B) to schedule and send messages to individual subscribers.

FIG. 1B shows example implementations of elements of FIG. 1A and example interconnections between these elements according to some implementations. That is, FIG. 1B also illustrates environment 10, but FIG. 1B shows various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E. In other implementations, the environment 10 may not have the same elements as those shown by FIG. 1B or may have other elements instead of, or in addition to, those listed.

In FIG. 1B, the network interface 20 and/or processor system 17 is/are implemented as a set of application servers $100_1$-$100_X$ (where X is a number) Each application server 100 (also referred to herein as an "app server", an "API server", an "HTTP application server," a "worker node", and/or the like) is configured to communicate with tenant DB 22 and the tenant data 23 therein, as well as system DB 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space (TMPS) 110. In various embodiments, the process space 28 includes one or more query processors 103, one or more message send (MS) processors 105, and one or more send time optimization (STO) processors 106.

The MS processor(s) 105 stream or otherwise provide message send requests (MSRs) to the OMMs 350. The MSRs are sent to the app server 100 by the CP 50 via the API/WS 32 in response to a detected interaction with the CP 50 by a user system 12 and/or a detected interaction with a previously sent message by a user system 12. In some implementations, the MSRs may be sent in batches, or the API/WS 32 may include separate calls for single and batch subscriber MSR submissions. Aspects of the MSRs are discussed in more detail infra. The MS processor(s) 105 may also stream or otherwise provide message send tracking data to other entities/elements in system 16, such as database objects in the tenant space 112 or the like. Aspects of message send tracking data is discussed in more detail infra. According to various embodiments, the STO processor(s) 106 are systems and/or applications that predict send times for individual recipients (e.g., user systems 12) based on previous engagements/interactions with previously sent messages and/or interactions with the CP 50. These and other aspects are discussed in more detail infra. These and other aspects are discussed in more detail infra with respect to FIGS. 3-5. In some implementations, the STO processor(s) 106 may be included in, or otherwise operated by, some other system or entity discussed herein, such as one or more of the OMMs 350, a system shown and described with respect to FIGS. 2A-2B, or a separate, stand alone, STO system (not shown).

The MS processor(s) 105 and STO processor(s) 106 may be implemented as software components (e.g., software engines, software agents, artificial intelligence (AI) agents, modules, objects, or other like logical units), as individual hardware elements, or a combination thereof. In an example software-based implementation, the MS processor(s) 105 and STO processor(s) 106 may be developed using a suitable programming language, development tools/environments, etc., which are executed by one or more processors of one or more computing systems (see e.g., processor system 17 of FIG. 1A). In this example, program code of the MS processor(s) 105 and STO processor(s) 106 may be executed by a single processor or by multiple processing devices. In an example hardware-based implementation, the MS processor(s) 105 and STO processor(s) 106 are implemented by respective hardware elements, such as GPUs (or floating point units within one or more GPUs), hardware accelerators (e.g., FPGAs, ASICs, DSPs, SoCs, etc.) that are configured with appropriate logic blocks, bit stream(s), etc. to perform their respective functions, AI accelerating co-processor(s), tensor processing units (TPUs), and/or the like. In some embodiments, the MS processor(s) 105 and STO processor(s) 106 may be implemented using stream processor(s), which are systems and/or applications that send or receive data streams and execute the applications or analytics logic in response to detecting events or triggers from the data streams. The stream processor(s) process data directly as it is produced or received and detect conditions from the data streams within a relatively small time period (e.g., measured in terms of milliseconds to minutes). The stream processor(s) may be implemented using any stream/event processing engines or stream analytics engines such as, for example, Apache® Kafka®, Apache® Storm®, Apache® Flink®, Apache® Apex®, Apache® Spark®, IBM® Spade, Nvidia® CUDA™, Intel® Ct™, Ampa™ provided by Software AG®, StreamC™ from Stream Processors, Inc., and/or the like.

The application platform 18 includes an application setup mechanism (ASM) 38 that supports application developers' ("app developers") creation and management of applications. Such applications and others can be saved as metadata into tenant DB 22 by save routines (SRs) 36 for execution by subscribers as one or more tenant process spaces 104 managed by tenant management process 110, for example. Invocations to such applications can be coded using Procedural Language (PL)/Salesforce® Object Query Language (SOQL) 34, which provides a programming language style interface extension to Application Programming Interface (API) 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

In some implementations, the application platform 18 also includes policies 35. The policies 35 comprise documents and/or data structures that define a set of rules that govern the behavior of the various subsystems of the app server 100. For example, one or more of the policies 35 may dictate how to handle network traffic for specific network addresses (or address ranges), protocols, services, applications, content types, etc., based on an organization's information security (infosec) policies, regulatory and/or auditing policies, access control lists (ACLs), and the like. Additionally, the policies 35 can specify (within various levels of granularity) particular users, and user groups, that are authorized to access particular resources or types of resources, based on the org's hierarchical structure, and security and regulatory requirements. The documents or data structures of the policies 35 may include a "description," which is a collection of software modules, program code, logic blocks, parameters, rules, conditions, etc., that may be used by the app server 100 to control the operation of the app server 100 and/or access to various services. Any suitable programming languages, markup languages, schema languages, etc., may be used to define individual policies 35 and instantiate instances of those policies 35. As examples, the policies 35 may be defined using XML, JSON, markdown, IFTTT ("If This Then That"), PADS markup language (PADS/ML), Nettle, Capirca™, and/or some other suitable data format, such as those discussed herein.

The application platform 18 may be, or may include, a development environment, programming language(s), and/or tools (collectively referred to as a "development environment", "dev-environment" and the like) that allows app developers to create/edit applications for implementing the various embodiments discussed herein. As examples, the dev-environment may be or include a software development environment (SDE), an integrated development environment (IDE), a software development kit (SDK), a software development platform (SDP), a schema builder, a modeling language application, a source code editor, build automation tools, debugger, compiler, interpreter, and/or some other like platform, framework, tools, etc. that may assist an app developer in building applications, configurations, definitions, and/or the like. In some implementations, the dev-environment may be a standalone application, or may be a web-based or cloud-based environment (e.g., a native application, a web application, or a hybrid application including GUIs that render an SDE/IDE/SDK/SDP implemented by a backend service (e.g., system 16) in a web browser or application container).

The system 16 of FIG. 1B also includes a user interface (UI) 30 and an API 32 (also referred to as a "web service") to system 16 resident processes, which allow users or developers at user systems 12 to access the resident processes. In some implementations, application (app) code, app/service templates, and/or policies 35 developed by customer platforms may be pushed or otherwise sent to the system 16 using API 32. In these implementations, the app code, app/service templates, and/or policies 35 may be developed using a development (dev) environment, programming language(s), and/or dev-tools provided by the system 16. The API 32 may be implemented as a remote API or a web API, such as a Representational State Transfer (REST or RESTful) API, Simple Object Access Protocol (SOAP) API, salesforce.com Apex API, and/or some other like API. The API 32 may be implemented as a web service including, for example, Apache® Axi2.4 or Axi3, Apache® CXF, JSON-Remote Procedure Call (RPC), JSON-Web Service Protocol (WSP), Web Services Description Language (WSDL), XML Interface for Network Services (XINS), Web Services Conversation Language (WSCL), Web Services Flow Language (WSFL), RESTful web services, and/or the like.

In some implementations, the API 32 may include one or more public APIs and one or more private APIs. The public APIs are APIs that includes one or more publically exposed endpoints that allows user systems 12 to access tenant data. These endpoints specify where resources are located and/or how particular web services can be accessed. The application 12y may be used to generate and transmit a message (e.g., an HTTP message) with a user-issued query and a suitable URI/URL to access of an endpoint of the system 16. In embodiments, one or more of the public APIs may be an asynchronous ("async") query API, where the user-issued query includes an API call or other like instruction indicating that a user-issued query should be treated as an aysnc query (referred to as an "async query verb"). The async query verbs to invoke the async query API may be defined by API 32 and can be coded using PL/SOQL 34 or some other suitable programming or query language. When an async query invokes the async query API, an async query engine (e.g., a query engine 103) or async query scheduler may generate a corresponding async query job. The term "job" as used herein refers to a unit of work or execution that performs work that comprises one or more tasks. Individual jobs may have a corresponding job entity comprising a record or DB object that stores various values, statistics, metadata, etc. during the lifecycle of the job or until the job is executed, which are placed in a schedule or queue and executed from the queue, in turn. An async query job entity corresponding to an async query job is a job entity existing for the during the lifecycle of an async query, which is placed in a schedule or queue and executed by the async query engine, in turn. The async public API may be implemented as a REST or RESTful API, SOAP API, Apex API, and/or some other like API, such as those discussed herein.

Private APIs are APIs 32 that are private or internal to the system 16, which allows system applications (e.g., tenant management process 110, system process 102, query engine(s) 103, MS processor(s) 105, and STO processor(s)

106 to access other system applications. The private APIs 32 may be similar to the public APIs 32 except that the endpoints of the private APIs 32 are not publically available or accessible. The private APIs 32 may be made less discoverable by restricting users, devices, and/or applications from calling or otherwise using the private APIs 32. For example, use of the private APIs 32 may be restricted to machines inside a private network (or an enterprise network), a range of acceptable IP addresses, applications with IDs included in a whitelist or subscriber list, requests/calls that include a particular digital certificate or other like credentials, and/or the like. The private APIs may be implemented as a REST or RESTful API, SOAP API, Apex API, a proprietary API, and/or some other like API.

Each application server 100 is communicably coupled with tenant DB 22 and system DB 24, for example, having access to tenant data 23 and system data 25, respectively, via a different network connection 15. For example, one application server $100_1$ can be coupled via the network 14 (e.g., the Internet), another application server $100_N$ can be coupled via a direct network link 15, and another application server $100_N$ can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used. The application servers 100 may access the tenant data 23 and/or the system data 25 using suitable private APIs as discussed previously.

In some implementations, each application server 100 is configured to handle requests for any user associated with any organization that is a tenant of the system 16. In this regard, each application server 100 may be configured to perform various DB functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (e.g., an F5 Big-IP load balancer) is communicably coupled between the application servers 100 and the user systems 12 to distribute requests to the application servers 100. In one implementation, the load balancer uses a least—connections algorithm to route user requests to the app servers 100 (see e.g., load balancer 228 of FIGS. 2A-2B discussed infra). Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be an organization (org) that employs a sales force where each salesperson uses system 16 to manage aspects of their sales. A user can maintain contact data, leads data, customer follow-up data, performance data, goals and progress data, etc., all applicable to that user's personal sales process (e.g., in tenant DB 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant DB 22 or system DB 24. The system 16 (e.g., an application server 100 in the system 16) can automatically generate one or more native queries (e.g., SQL statements or SQL queries or the like) designed to access the desired information from a suitable DB. To do so, the system 16 (e.g., an application server 100 in the system 16) may include one or more query engines 103, which is/are a software engine, SDK, object(s), program code and/or software modules, or other like logical unit that takes a description of a search request (e.g., a user query), processes/evaluates the search request, executes the search request, and returns the results back to the calling party. The query engine(s) 103 may be program code that obtains a query from a suitable request message via the network interface 20 that calls a public API, translates or converts the query into a native query (if necessary), evaluates and executes the native query, and returns results of the query back to the issuing party (e.g., a user system 12). To perform these functions, the query engine(s) 103 include a parser, a query optimizer, DB manager, compiler, execution engine, and/or other like components. In some implementations, each of the illustrated DBs may generate query plans to access the requested data from that DB, for example, the system DB 24 can generate query plans to access the requested data from the system DB 24. The term "query plan" generally refers to one or more operations used to access information in a DB system.

The query engine(s) 103 may include any suitable query engine technology or combinations thereof. As examples, the query engine(s) 103 may include direct (e.g., SQL) execution engines (e.g., Presto SQL query engine, MySQL engine, SOQL execution engine, Apache® Phoenix® engine, etc.), a key-value datastore or NoSQL DB engines (e.g., DynamoDB® provided by Amazon.com®, MongoDB query framework provided by MongoDB Inc.®, Apache® Cassandra, Redis™ provided by Redis Labs®, etc.), MapReduce query engines (e.g., Apache® Hive™, Apache® Impala™ Apache® HAWQ™, IBM® Db2 Big SQL®, etc. for Apache® Hadoop® DB systems, etc.), relational DB (or "NewSQL") engines (e.g., InnoDB™ or MySQL cluster™ developed by Oracle®, MyRocks™ developed by Facebook.com®, FaunaDB provided by Fauna Inc.), PostgreSQL DB engines (e.g., MicroKernel DB Engine and Relational DB Engine provided by Pervasive Software®), graph processing engines (e.g., GraphX of an Apache® Spark® engine, an Apache® Tez engine, Neo4J provided by Neo4j, Inc.™, etc.), pull (iteration pattern) query engines, push (visitor pattern) query engines, transactional DB engines, extensible query execution engines, package query language (PaQL) execution engines, LegoBase query execution engines, and/or some other query engine used to query some other type of DB system (such as any processing engine or execution technology discussed herein). In some implementations, the query engine(s) 103 may include or implement an in-memory caching system and/or an in-memory caching engine (e.g., memcached, Redis, etc.) to store frequently accessed data items in a main memory of the system 16 for later retrieval without additional access to the persistent data store. In various embodiments, the query engine 103 may control or enforce the order in which transactions are processed. In these embodiments, order in which transactions are executed may be based on an MDM consistent state, which as discussed in more detail infra, is used to ensure consistency and synchronization for MDM services provided by an MDM system (e.g., MDM system 304 of FIG. 3). In alternative embodiments, the MDM consistent state may be enforced by the STO processor(s) 106. These and other aspects are discussed in more detail infra.

Each DB can generally be viewed as a collection of objects, such as a set of logical tables, containing data fitted into predefined or customizable categories. As used herein, a "database object", "data object", or the like may refer to any representation of information in a DB that is in the form of an object or tuple, and may include variables, data structures, functions, methods, classes, DB records, DB fields, DB entities, associations between data and DB entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM DB can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM DB applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant DB system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Each application server 100 is also communicably coupled with one or more Outgoing Message Managers (OMM) $350_{1-Y}$ (where Y is a number; and collectively referred to as "OMMs 350" or "OMM 350"), which may also interact with the DBs 22 and 24. The OMMs 350 build and send messages to CP subscribers on behalf of CP 50. The OMMs 350 may comprise one or more pools of servers (also referred to as "message servers"), associated data storage devices, and/or other like computer devices dedicated to running/executing message management/processing and/or scheduling/queueing processes, procedures, mechanisms, etc. These message servers may include the same or similar processor systems, memory systems, network interface, and other like components as the app server 100 or other computer systems discussed herein. In embodiments, the OMMs 350 may process the content of messages received from various entities (e.g., app servers 100) of the system 16 to transform such messages into a desired outgoing message format. For outgoing messages, the OMMs 350 may convert the messages from an internal format/representation used by the entities of the system 16 to a format that can be consumed by external entities (e.g., user systems 12).

Additionally, each OMM 350 may include one or more message rendering entities (MREs), where each MRE include or operate various message processing applications and protocols to generate and transmit the messages. The MREs may generate messages based on MSRs and send definitions (discussed infra). The MREs send the generated messages to individual recipients, such user systems 12, or the MREs may provide the generated messages to a suitable system or application to be sent to the intended recipients. As examples, the MREs may be or operate mail transfer agent (MTA) applications to receive and transfer email messages to/from various user systems 12 in accordance with Simple Mail Transfer Protocol (SMTP), extended SMTP, Post Office Protocol 3 (POP3), Internet Message Access Protocol (IMAP), and/or some other suitable email protocol. In another example, the MREs may provide push notification services using Webpush, HTTP server push, WebSockets, etc. to provide push notifications to various user systems 12. In another example, the MREs may act as External Short Messaging Entities (ESMEs) that implement SMS server/gateway applications and/or implement the Short Message Peer-to-Peer (SMPP) protocol to send/receive SMS/MMS messages to user systems 12 via Short Message Service Centers (SMSC). In another example, the MREs may implement various streaming technologies or protocols to generate and broadcast audio or video data, and/or send/receive OTT messages. The messages may be built and sent to individual recipients as discussed in commonly assigned U.S. application Ser. No. 15/791,184 titled "TECHNOLOGIES FOR LOW LATENCY MESSAGING" filed on Oct. 23, 2017, and commonly assigned U.S. application Ser. No. 15/997,215 titled "MESSAGE LOGGING USING TWO-STAGE MESSAGE LOGGING MECHANISMS" filed on Jun. 4, 2018, both of which are hereby incorporated by reference in their entireties and for all purposes.

As mentioned previously, customer platforms 50 (not shown by FIG. 1B) may be customers or tenants of the system 16 that develop CP apps that interact and/or integrate with the system 16 and utilize data from an associated tenant space in tenant DB 22. In various embodiments, the CP apps utilize tenant data for interacting with user systems 12 by, for example, sending messages to various user systems 12 (e.g., subscribers of the CP 50) via the system 16. To do so, the CP apps include program code or script(s) that call an API/WS 32 to create and execute the sending of these messages based on various triggering events. The CP apps may also include program code/scripts that call APIs/WS 32 to schedule and send messages. CP 50 may identify message recipients using dynamic, rule-based segmentation of lists, trigger events, and/or profiles. After a message is sent, CP apps may call the APIs/WS 32 to return aggregate statistics about various interactions with the content contained in the messages. The messages to be sent to individual recipients may be referred to as "message sends," "sends," and/or the like. A "message send" is an individual message sent to one or more recipients (e.g., a subscriber, client, customer, etc. operating user systems 12). As examples, the message sends may be emails, push notifications, SMS/MMS messages, over-the-top (OTT) messages, microblogging and/or social media posts, direct messages in social media platform, and/or other type of computer-readable message. The message sends may include, for example, text, audio content, video content, animations, links or references to web resources, and/or other like content.

In order to send messages to intended recipients, the CP 50 may develop program code, script(s), etc., to define particular messages to be sent to intended recipient(s) based on particular interactions with a CP. This code/script(s) may be referred to as a "send definition," "message definition," "send template," "send configuration," "send classification," "message interaction," "triggered message interaction," and the like. The send definition is a configuration or policy that is used to send and track built messages, and defines various parameters for message send jobs that may be reused for multiple message sends or interactions/events. This allows CPs to set rules/conditions for generating personalized media and/or dynamic content for particular subscribers. The system 16 generates and sends messages according to the conditions/rules set by the send definition.

The rules/conditions defined by a send definition can be CP-initiated or based on one or more trigger events. CP-initiated messages may be sent to identified subscribers at specified times/dates. As examples, CP-initiated messages may include periodic (e.g., weekly, monthly, etc.) newsletters, list of offers or advertisements, marketing messages, Amber alerts, weather alerts, low-account-balance alerts, subscription renewal messages, and/or the like. A trigger event may be any type of event or action, which may or may not be based on a user, device, or system interaction with a CP 50 or content within a message. The trigger events may include, inter alia, user interactions with the CP 50, user interactions with content included in previously sent messages, dates and/or times of day, messages/indications received from other platforms/services, and/or the like. As examples, trigger events may include completion of an online form, submitting a purchase order, performing a search, abandoning an online form or a shopping cart, failing to login after a number of login attempts, resetting a user name or password, signing up to an email list, requesting more information, opening a message send, interacting with (e.g., clicking/tapping on) content and/or a particular area within a message, etc. Message sends that are based on trigger events may be referred to as "trigger sends."

The send definitions define message types, message formats, and content to be sent to particular subscribers based on demographic data and/or when a particular trigger event occurs. In some implementations, the send definitions may include send classifications, content, destination management information, and send options. A send classification include parameters for a message job in a central location that can be reused for multiple triggered interactions. The content is the message to send when the send definition is triggered. The CP 50 50 may create or upload personalized and/or dynamic content using a development environment and/or GUI tools provided by the system 16. Destination management information includes subscriber identities (IDs) to which messages are to be sent, such as email addresses, phone numbers, application names/IDs, etc. The subscriber IDs may be supplied by one or more subscriber lists, or data extensions (DEs) that extract data from various database objects in the DB 22. Send options include parameters related to how statistics from the messages are tracked, keywords to categorize the send definition, and/or the like. In various embodiments, the system 16 provides a send optimization tool that predicts a time and/or date when individual subscribers are most likely to interact with a particular message send, and the send definition may indicate that the system 16 should send message sends to individual subscribers according to the predictions provided by the send optimization tool.

The send definitions may be developed using any suitable mark-up language, object notation language, programming language, including the various languages, tools, etc., discussed herein, and a CP 50 can push send definitions to the system 16 through a suitable API/WS 32. For example, message sends for a newsletter may be initiated by an API/WS 32 or GUI 30, while triggered sends may be initiated using only the API/WS 32. The send definitions include information that the system 16 uses each time a message is triggered, such as a unique external key value that is used by API/WS 32 calls to initiate the send definition. The system 16 may provide a dev-environment, programming language(s), and/or development tools that allows CP 50 to create/edit send definitions, such as those discussed herein. The dev-environment may allow the CP 50 to define multiple message sends that the system 16 may accept via API/WS 32 requests in response to detection of corresponding interactions. For example, the CP 50 may define individual message sends for account balance alerts, account security alerts, account activity acknowledgements, newsletter blasts, advertisements, time-based sales events, and/or the like.

The dev-environment may include destination management tools and reply management tools. The destination management tools may allow the CP 50 to define target recipients (e.g., one or more user systems 12) or subscriber lists of recipients to receive the built messages, and particular message delivery mechanisms to be used for building and sending the messages (e.g., using SMS/MMS, OTT, push notifications, email, etc.). The reply management tools allow the CP 50 to define automatic responses/replies to recipient messages, such as out-of-office replies, auto-replies, and unsubscribe requests received in response to message sends. The dev-environment may also allow the CP 50 to define various send options, which specify how and what type of statistics are tracked from MSRs and/or built messages. The dev-environment may also include tools that allow the CP 50 to activate or create and define one or more custom database objects (CDBOs) to store custom data. These CBDOs may be referred to as "data extensions." A DE may be a table or other like database object (DBO) within the tenant space 112 of the tenant DB 22 that stores various subscriber-related data, and also maintains an association with a subscriber list which allows unified subscriber subscription and status management, tracking, and reporting. DE message sends may use CP-defined data as a source for message send recipients.

As mentioned previously, the MS processor(s) 105 handle various message send tracking aspects. Tracking is an aggregated collection of data that allows the CP 50 to record and view various metrics related to message sends, such as an open rate, a number of clicks or click-through rate, undeliverable messages or bounce rate, forwarded messages and a number of new subscribers each forward generated, and/or other metrics. In some embodiments, the tracking may be accomplished using a return receipt such as when the message is an email. In some embodiments, the tracking may be accomplished using a web beacon, such as a transparent image (e.g., a 1×1 pixel GIF) or HTML element/tag (e.g., using framing), which is automatically included in each message send. Where the transparent image is used, the subscribers browser/application may automatically download the image by sending a request to the app server 100 (MS processor(s) 105) and/or a location where the image is stored when the subscriber opens the message and the request would include or provide identifying information about the user system 12. Where HTML elements/tags is/are used, the subscribers browser/application may send a request to the app server 100 (MS processor(s) 105) for referred to content included in the message when the subscriber opens the message and the request would include or provide identifying information about the user system 12. In other embodiments, the tracking may be accomplished using a script or other like code included in the message. For example, the message may include script (e.g., JavaScript or the like) that obtains and sends back information (e.g., in an additional HTTP message(s)) that is not typically included in an HTTP header, such as time zone information, global positioning system (GPS) coordinates, cookie data stored at the user system 12, screen or display resolution of the user system 12, and/or other like information. Other methods may be used to obtain or derive user information. In another implementation, canvas fingerprinting may be used where the script included in the message draws text with a predetermined font, size, and background color(s), calls a Canvas API ToDataURL method to get the canvas pixel data in dataURL format, calculates a hash of the text-encoded pixel data which serves as the fingerprint, and sends the fingerprint back to the app server 100 (MS processor(s) 105). Other tracking mechanisms may be used in other embodiments.

When a CP-initiated event or a trigger event occurs at the CP 50, the code/script(s) implemented by the CP 50 calls the API/WS 32, and sends an MSR to an app server 100. The app server 100 (or MS processor 105) sends the MSR to an OMM 350, which generates and transmits a corresponding message to a particular recipient based on the information/data included in the MSR. In some implementations, the MSRs may be sent in batches, or the API/WS 32 may include separate calls for single and batch subscriber MSR submissions. Each MSR may include MSR information and an MSR payload. In one example, MSR information and MSR payload may be located in a payload (body) portion of an HTTP message, which may be in HTML, XML, JSON, and/or some other suitable format and variants thereof. Other message types (such as any message type discussed herein) and arrangements of data in such messages may be used in other embodiments. The MSR information includes CP-specific information such as a customer identifier (ID) (also referred to as a "tenant ID", "org ID", and the like) that indicates/identifies the CP 50, an MSR ID that indicates/identifies a universally unique ID (UUID) of the MSR, an MSR Job ID (request ID) that indicates/identifies a UUID of the MSR job and/or the request, and a priority indicator/indication that indicates/identifies a priority of the MSR payload. The priority information may indicate a priority or rank associated with the MSR payload using levels (e.g., high, medium, low), a number scheme (e.g., 1 through 10), or an amount of time to delivery (e.g., by a specified time/date, a specified number of seconds, etc.). The MSR payload includes both recipient specific attributes that are used to build a personalized message from the send definition, fully rendered content specific to the recipient, or some combination thereof. For example, the MSR payload may include a send definition ID, send time data, and/or other like information. The send definition ID indicates a location/address of a send definition associated with the CP 50, which may be used to access the send definition to build a message for intended recipients. The send time data may indicate a time and/or date when the message should be sent to the individual recipient or when the message should arrive at the recipient's device. In various embodiments, the send time data may indicate to use a send time predicted by the send time optimization tool embodiments discussed infra with respect to FIGS. 3-5.

Figure 2A:
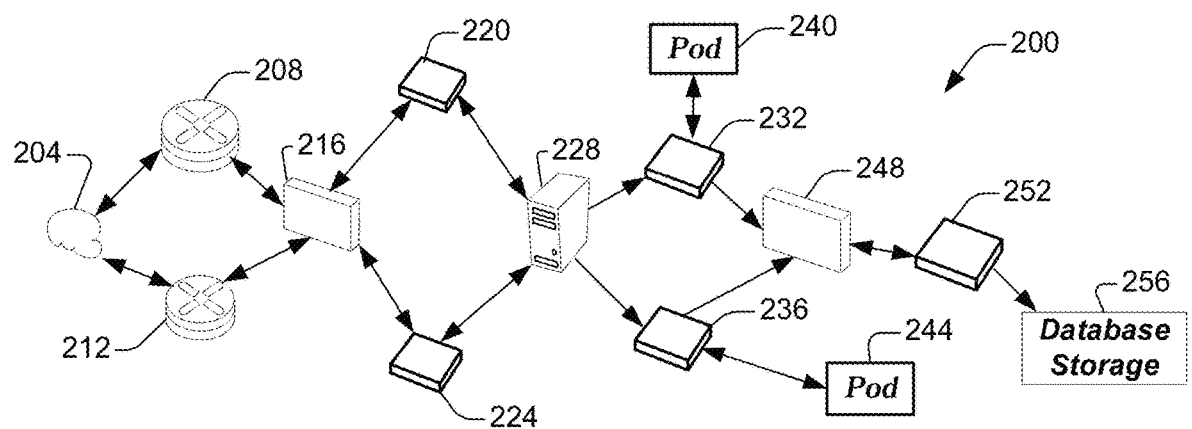
FIG. 2A shows example architecture of an on-demand database service environment according to various embodiments.

FIG. 2A shows a system diagram illustrating example architectural components of an on-demand DB service environment 200 according to some implementations. A client machine communicably connected with the cloud 204, generally referring to one or more networks in combination, as described herein, can communicate with the on-demand DB service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand DB service environment can communicate with DB storage 256 through a DB firewall 248 and a DB switch 252.

Figure 2B:
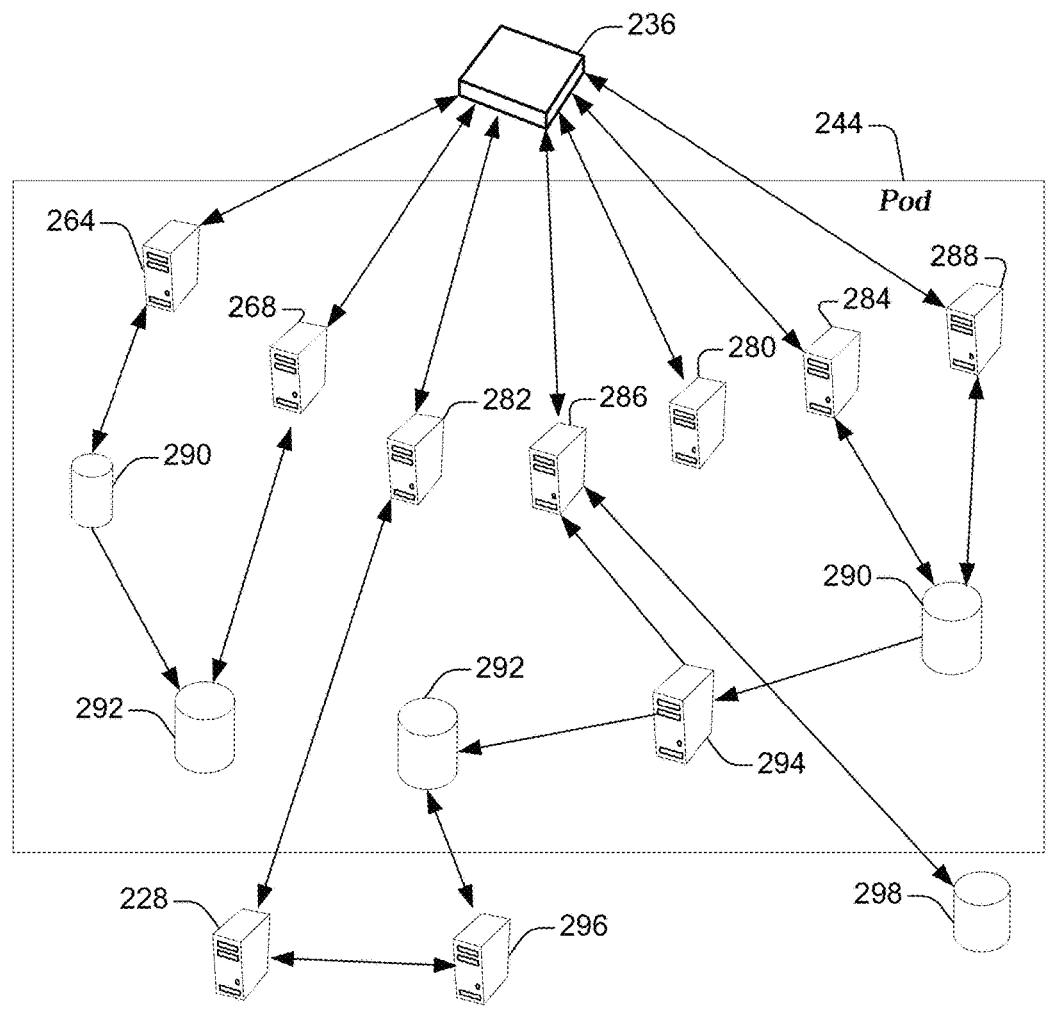
FIG. 2B shows example architectural components of the on-demand database service environment of FIG. 2A according to various embodiments.

As shown in FIGS. 2A and 2B, accessing an on-demand DB service environment can involve communications transmitted among a variety of different hardware or software components. Further, the on-demand DB service environment 200 is a simplified representation of an actual on-demand DB service environment. For example, while only one or two devices of each type are shown in FIGS. 2A and 2B, some implementations of an on-demand DB service environment can include anywhere from one to several devices of each type. Also, the on-demand DB service environment need not include each device shown in FIGS. 2A and 2B, or can include additional devices not shown in FIGS. 2A and 2B. One or more of the devices in the on-demand DB service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 refers to a data network or multiple data networks, often including the Internet. Client machines communicably connected with the cloud 204 can communicate with other components of the on-demand DB service environment 200 to access services provided by the on-demand DB service environment. For example, client machines can access the on-demand DB service environment to retrieve, store, edit, or process information. In some implementations, the edge routers 208 and 212 route packets between the cloud 204 and other components of the on-demand DB service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand DB service environment 200 from Internet traffic. In some embodiments, firewall 216 may be an active firewall. The firewall 216 can block, permit, or deny access to the inner components of the on-demand DB service environment 200 based upon a set of rules and other criteria (e.g., the policies 35 discussed previously). The firewall 216 can act as, or implement one or more of a packet filter, an application gateway, a stateful filter, a proxy server, virtual private networking (VPN), network access controller (NAC), host-based firewall, unified threat management (UTM) system, a Predictive Intelligence (PI) and/or FaaS, and/or any other type of firewall technology.

In some implementations, the core switches 220 and 224 are high-capacity switches that transfer packets within the on-demand DB service environment 200. The core switches 220 and 224 can be configured as network bridges that quickly route data between different components within the on-demand DB service environment. In some implementations, the use of two or more core switches 220 and 224 can provide redundancy or reduced latency.

In some implementations, the pods 240 and 244 perform the core data processing and service functions provided by the on-demand DB service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the DB storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the DB storage 256 is guarded by a DB firewall 248. In some implementations, the DB firewall 248 is an active firewall. Additionally, the firewall 248 may be equipped with the group optimization technologies discussed herein. The DB firewall 248 can act as a computer application firewall operating at the DB application layer of a protocol stack. The DB firewall 248 can protect the DB storage 256 from application attacks such as structure query language (SQL) injection, DB rootkits, and unauthorized information disclosure. In some implementations, the DB firewall 248 includes a host using one or more forms of reverse proxy services to proxy traffic before passing it to a gateway router. The DB firewall 248 can inspect the contents of DB traffic and block certain content or DB requests. The DB firewall 248 can work on the SQL application level atop the TCP/IP stack, managing applications' connection to the DB or SQL management interfaces as well as intercepting and enforcing packets traveling to or from a DB network or application interface.

In some implementations, communication with the DB storage 256 is conducted via the DB switch 252. The multi-tenant DB storage 256 can include more than one hardware or software components for handling DB queries. Accordingly, the DB switch 252 can direct DB queries transmitted by other components of the on-demand DB service environment (for example, the pods 240 and 244) to the correct components within the DB storage 256. In some implementations, the DB storage 256 is an on-demand DB system shared by many different organizations as described above with reference to FIGS. 1A and 1B.

FIG. 2B shows a system diagram further illustrating example architectural components of an on-demand DB service environment according to some implementations. The pod 244 can be used to render services to a user of the on-demand DB service environment 200. In some implementations, each pod includes a variety of servers or other systems. The pod 244 includes one or more content batch servers 264, content search servers 268, query servers 282, file (force) servers 286, access control system (ACS) servers 280, batch servers 284, and app servers 288. The pod 244 also can include DB instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (e.g., programs, routines, scripts, etc.) for supporting the construction of applications provided by the on-demand DB service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods. In various implementations, the app servers 288 may be the same or similar to the app servers 100 discussed with respect to FIGS. 1A-1B.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand DB service environment. The file servers 286 can manage requests for information stored in the file storage 298. The file storage 298 can store information such as documents, images, and basic large objects (BLOBs). By managing requests for information using the file force servers 286, the image footprint on the DB can be reduced. The query servers 282 can be used to retrieve information from one or more file systems. For example, the query system 282 can receive requests for information from the app servers 288 and transmit information queries to the NFS 296 located outside the pod.

The pod 244 can share a DB instance 290 configured as a multi-tenant environment in which different organizations share access to the same DB. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, a QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems (NFS) 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand DB service environment. The NFS 296 also can communicate with the QFS 292 to update the information stored on the NFS 296 or to provide information to the QFS 292 for use by servers located within the pod 244.

In some implementations, the pod includes one or more DB instances 290. The DB instance 290 can transmit information to the QFS 292. When information is transmitted to the QFS, it can be available for use by servers within the pod 244 without using an additional DB call. In some implementations, DB information is transmitted to the indexer 294. Indexer 294 can provide an index of information available in the DB 290 or QFS 292. The index information can be provided to file force servers 286 or the QFS 292.

II. Send Time Optimization Embodiments

As mentioned previously, CPs 50 may define various conditions and/or triggers for sending messages to subscribers. In general, CPs 50 do not know when the best or most optimal time for sending messages to subscribers. In this context, the best or most optimal time to send messages refers to a time of maximum or most probable engagement, such as times when individual subscribers are most likely to open or interact with a message send. This is because different subscribers have different preferences in terms of how and when they read their messages, including preferred message type (e.g., email, SMS, MMS, OTT, social media post, etc.), ordering preferences (e.g., opening/reading newest messages, according to keywords, sender ID/address, etc.), and timing preferences (e.g., time of day when subscribers open/read messages). CPs 50 want to determine the best/optimal time to send messages to subscribers so that the messages have a higher chance of being consumed by the subscribers. Typically, CPs 50 use a holistic approach to sending message, for example, sending messages late at night or early in the morning because they believe subscribers consume their messages in the morning. This approach may work for some set of a subscriber population, however, this approach does not involve any user/subscriber personalization. According to various embodiments, send time optimization tools (e.g., STO processor(s) 106 discussed previously) provide personalized predictions of optimal send times for individual subscribers.

Historically, send time predictions were based on classification and/or regression models, where extracted features are associated with message send times and open times, and various send times are fed into the model to obtain the highest engagement probability. These classification and regression models are somewhat effective except that they tend to be biased towards send times traditionally used by CPs 50. This is because the only available send times that exist historically are available to be used as samples for generating a suitable model, whereas feedback of potential send times that have not been used before are unknown and unavailable for training. This means that sampling bias presented in the historical data cannot be handled properly in these models. In other words, the prediction results provided by the classification/regression models naturally bias towards those pre-existing times and away from unexplored send times. Additionally, these classification models do not usually account for how some subscribers' behavior tend to reinforce these biases even though these behaviors may not match the behaviors of other subscribers. Conventional classification and regression models do not extract enough meaningful and predictive features that can capture the relationships between message send time and engagement for individual subscribers.

The send time optimization tools (e.g., STO processor(s) 106) account for the delay and/or lag between the send time and the time when a subscriber engages with a message (e.g., a time when the subscriber opens the message and/or interacts with the message content), and provides personalized recommendations for sending messages for individual subscribers. In various embodiments, a machine learning (ML) approach is used to predict the best send time to send individual messages to individual subscribers for improving message engagement. This approach automatically discovers hidden factors underneath message sends and send time engagements/interactions, and leverages crowd opinion for subscribers that do not have sufficient data. The ML model makes personalized recommendations based on the unique characteristics of each subscriber's engagement preferences and patterns, accounts for the time between the send time and open time which typically varies from subscriber to subscriber, and accounts for historical feedback that is generally incomplete and skewed towards a small set of send hours. In embodiments, the ML model is a two-layer non-negative matrix factorization model, which is shown and described with respect to FIGS. 3 and 4.

Figure 3:
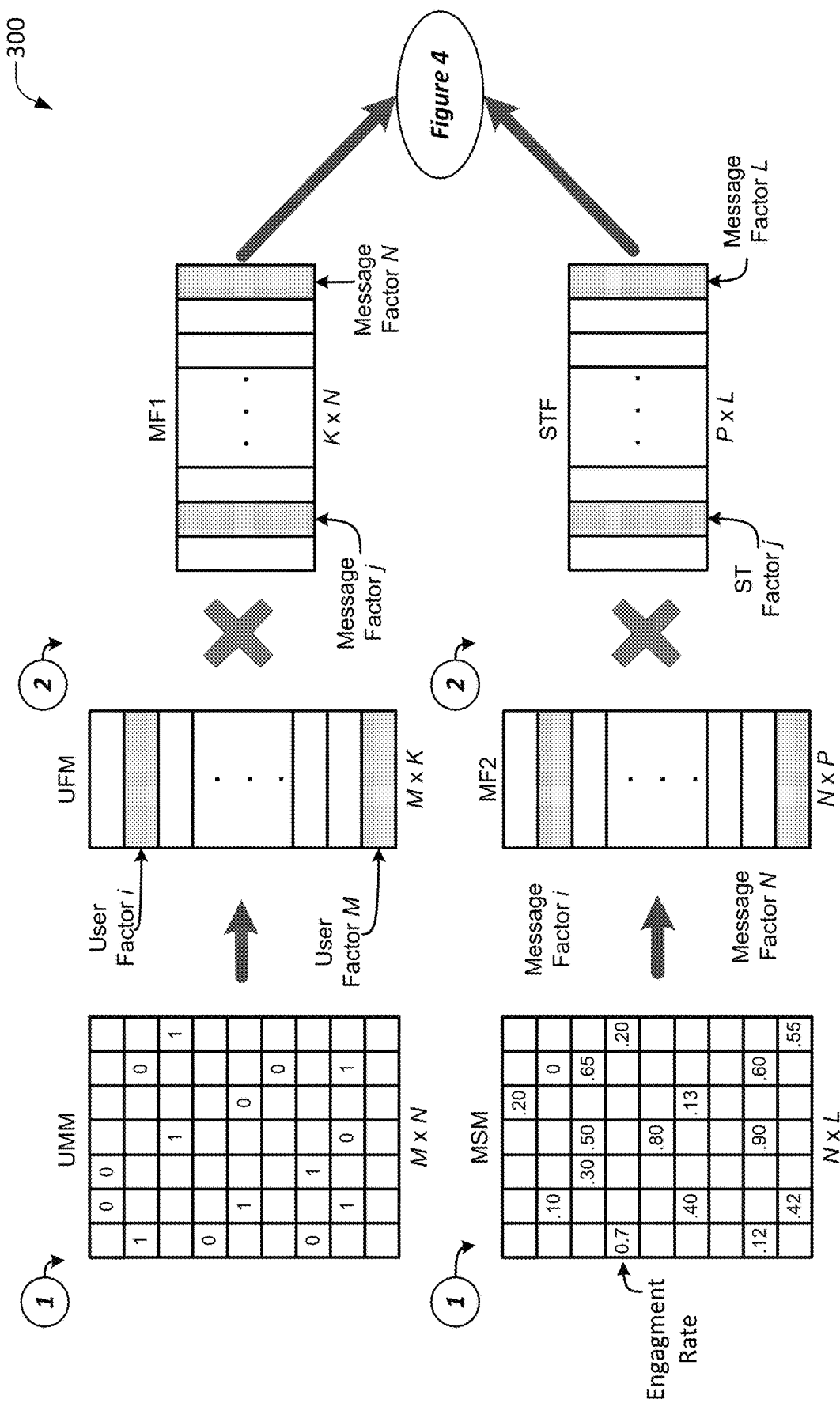
FIGS. 3-4 illustrate an example Send Time Prediction procedure according to various embodiments.
Figure 4:
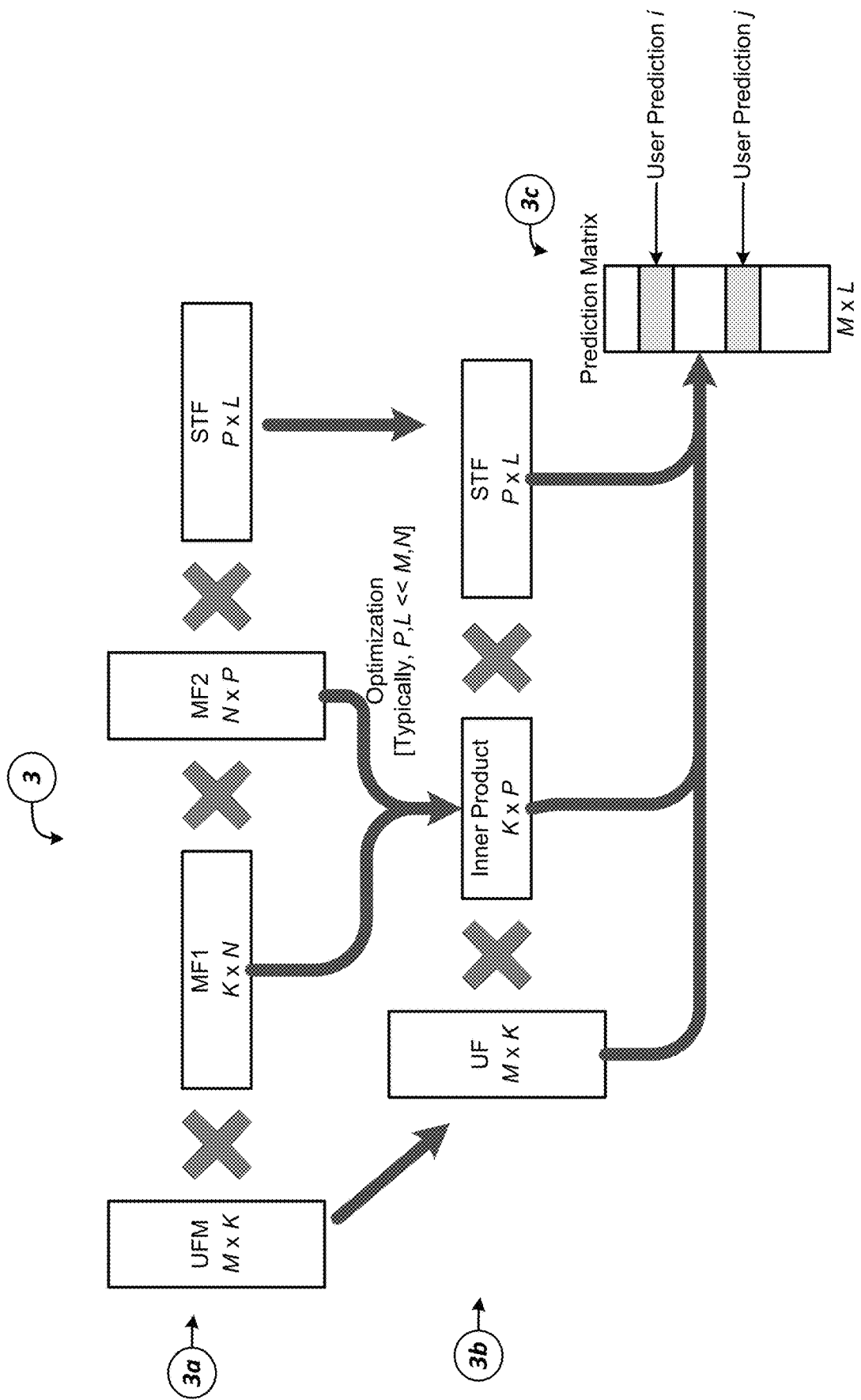

FIGS. 3 and 4 show an example send time optimization model ("STO model") 300 according to various embodiments. In this example, the STO model 300 is a two-layer non-negative matrix factorization model. In embodiments, the STO processor(s) 106 may generate the STO model 300 as follows.

At node 1, the STO processor(s) 106 generates two components, the first component being an interaction or engagement component that captures the interactions/engagement of a particular message with a particular subscriber, and the second component being a send time component that captures a relationship between a message and send time. In this example, the engagement component is an M×N User-Message Matrix (UMM) containing the interactions between M number of users and N number of sent messages (or message campaigns), and the send time component is an N×L Message Send time Matrix (MSM) with N number of sent messages for L number of time instances. In one example, L=24*7=168. In the UMM, each column corresponds to an individual message and each row corresponds to an individual user. Additionally, each cell in the UMM represents a subscriber's engagement with a particular message. In this example, a cell in the UMM is set to 1 if the user engaged with the message and set to 0 otherwise. In some cases, empty cells may also represent a non-engaged message or may represent missing engagement data for that user/subscriber such as when a subscriber's browser/application settings has disabled image loading or uses some other tracking blocker application, the subscriber's ISP uses some sort of virus scanner before forwarding the message to the subscriber opens the email, or the like. For users/subscribers that have little to no engagement information, crowd opinions may be used to generate personalized predictions.

In the MSM, each column corresponds to an individual send time and each row corresponds to an individual message. Additionally, each cell in the MSM includes an engagement rate for a corresponding message at a particular time instance. An engagement rate is a metric that measures the level of engagement that content receives from a set of subscribers/users (e.g., an "audience"). Various factors may influence engagement depending on the type of engagement being measured. In embodiments, the engagement rate represents a rate (e.g., a percentage value) at which a particular message was engaged with for a particular send time. In this example, the engagement rate is an opening rate, which represents a rate at which a particular message was opened for a particular send time. In other embodiments, other engagement rates may be used, such as a click-through rate, conversion rate (e.g., rate at which a desired action or task is performed), response rate (e.g., amount of subscribers who respond to a certain message), share or virility rate (e.g., a rate at which a message, such as a social media post, is forwarded or otherwise shared with other subscribers/users), and the like.

Next at node 2, the STO processor(s) 106 decompose each of the UMM and the MSM into a product of two lower dimensional components. In this example, the STO processor(s) 106 derive K dimensional factors for all users and all messages from the UMM to decompose the UMM into an M×K User Factor Matrix (UFM) and a K×N (first) Message Factor Matrix (MF1). Each row in the UFM is a user factor, and each column in the MF1 is a message factor. Additionally, the STO processor(s) 106 derive P dimensional factors for all messages and send times from the MSM to decompose the MSM into an N×P (second) message factor matrix (MF2) and an P×L Send Time Factor matrix (STF).

The user factors K represent individual aspects of a subscriber's message open behavior. The user factors K are used to calculate the similarity between different users with respect to their message preferences and engagement habits, which alleviates issues related to cold start problems (e.g., due to users with limited historical feedback/messages). The message factors P represent relationships between individual subscribers and different messaging campaigns. The message factors P may be thought of as a persona or demographic profile for a particular message or message campaign. Each of the messaging campaigns may be represented by a code, which may be a number such as a series of floating point digits. Subscribers encoded with a particular code in the STF or MF2 will most likely react in the same way to a message or message campaign.

Matrix factorization allows hidden features to be easily mined to a desired quality while retaining the interactions between two dimensions as compared to standard classification or regression models, where feature extraction engineering is usually done through manual crafting and many iterations of guesses and trials. Decomposing (e.g., factorizing) the UMM captures the hidden interactive relationships between users/subscribers and messages, and decomposing (e.g., factorizing) the MSM uncovers the relationships between messages and send times with respect to engagement.

In some embodiments, the rank of both message factor matrices (e.g., MF1, MF2, or the combined K and P matrix) can be customized based on for example, scalability and/or computational costs/complexity, sparsity, and/or the like. Scalability refers to the amount of users and/or messages to be processed, and the amount of computational resources, needed to calculate the predicted send times. In embodiments, the size of the message factor matrices may be configured based on the size of the interaction matrix (e.g., the M×N UMM). Sparsity in this context refers to the number of engagements that exist for a particular message. As an example, since the number of messages may be extremely large, even the most active users will only have engaged with a relatively small subset of the overall number of messages.

Next, the STO processor(s) 106 derive the predictions for each subscriber from the four factor components (e.g., UFM, MF1, MF2, and STF). In this example, the matrix multiplication yields the prediction matrix, which includes a row for each user prediction (see e.g., FIG. 4).

Referring now to FIG. 4, which shows an example of node 3 of STO model 300 according to various embodiments. In FIG. 4, node 3 includes nodes 3a, 3b, and 3c. At node 3a, the four factor matrices (e.g., UFM, MF1, MF2, and STF) are chained together using matrix multiplication to build the bridge from users to send times and to predict the optimal/best send time for each user/subscriber.

However, when CPs 50 have millions (or billions) of subscribers and send millions (or billions) of messages, the UMM and the MSM (and consequently, the UFM, MF1, MF2, and STF) may become extremely large, and performing multiplication on such large matrices becomes computationally complex and resource intensive, even where distributed computing systems are used. In order to address scaling challenges associated with matrix multiplication, the order of multiplication is switched by first calculating the product of the two inner message factors (e.g., MF1 and MF2). In this example, the inner product of UFM×MF1×MF2×STF is performed and yields UFM×Inner Product(K×P)×STF as is shown by node 3b. the UFM, inner product of K×P, and the STF are then combined to yield a single prediction component, which in this example is an M×L prediction matrix. Since K and P are usually orders of magnitude smaller than M and N, such embodiments can greatly reduce resource consumption and computational overhead by creating an intermediate low rank component (e.g., Inner Product(K×P)). The scalability and efficiency improvements increase as the M number of users and/or N number of messages become relatively large.

Figure 5:
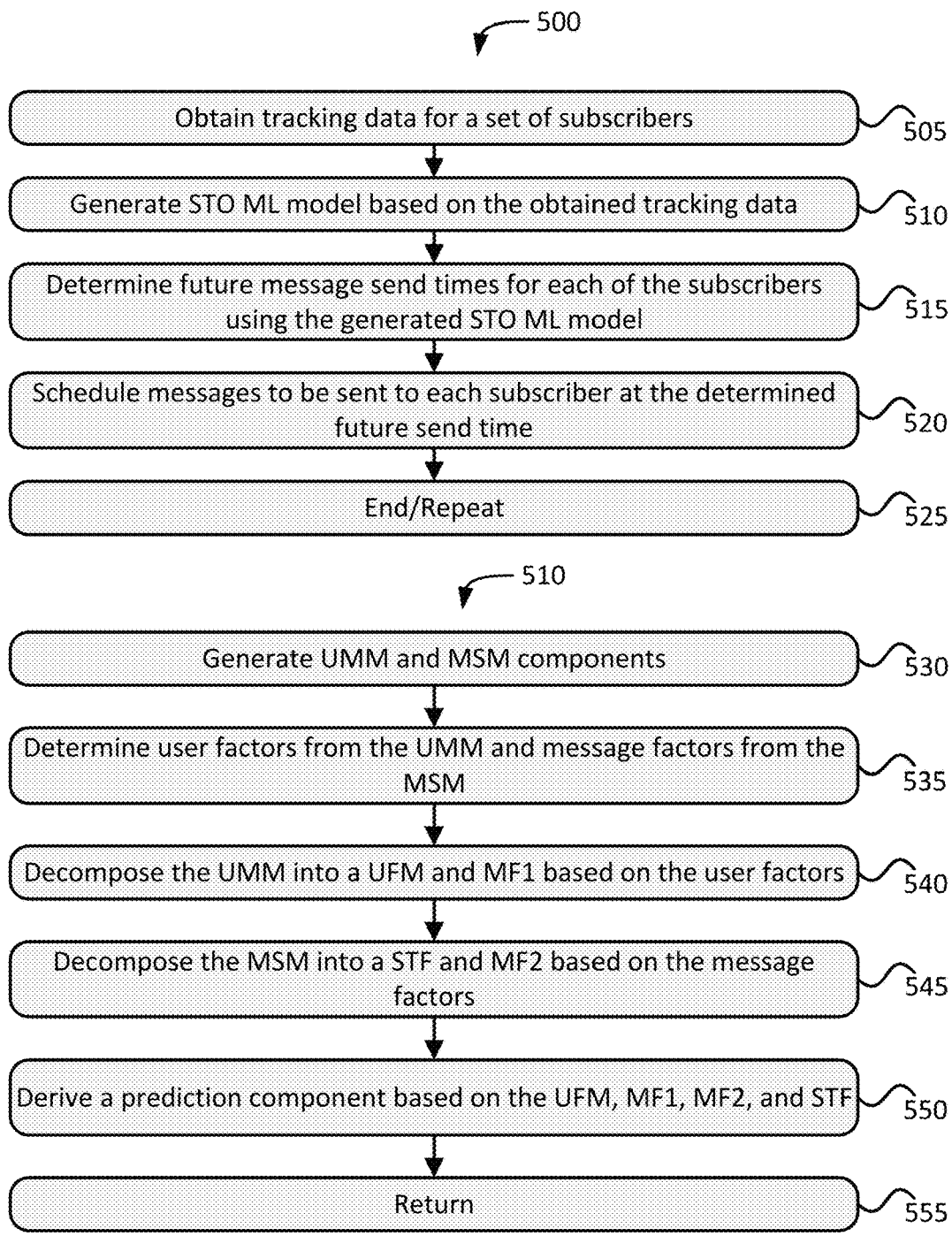
FIG. 5 show an example process for carrying out the various embodiments discussed herein.

FIG. 5 illustrates a send time optimization process 500 according to various embodiments. For illustrative purposes, the operations of process 500 is described as being performed by elements/components shown and described with regard to FIGS. 1A-4. However, other computing devices may operate process 500 in a multitude of implementations, arrangements, and/or environments. In embodiments, the computer system(s) includes program code stored in a memory system, which when executed by a processor system, is configurable to the computer system(s) to perform the various operations of processes 500. While particular examples and orders of operations are illustrated in FIG. 5, in various embodiments, these operations may be re-ordered, separated into additional operations, combined, or omitted altogether.

Process 500 begins at operation 505 where the STO processor 106 obtains tracking data for a set of subscribers. In embodiments, the tracking data may be collected by the MS processor(s) 105 as discussed previously. At operation 510, the STO processor 106 generates an ML model for message send time optimization (the "STO ML model"). The STO ML model is used to predict engagement rates for respective message send times for individual users/subscribers of a service provider platform (e.g., CP 50). Each of the predicted engagement rates for the respective message send times are based on time intervals between previous message send times and previous message interaction times for corresponding sent messages. Aspects of operation 510 are discussed in more detail infra. At operation 515, the STO processor 106 determines a future message send time for each of the respective subscribers based on the generated STO ML model. The future message sent time may be a predicted send time that will maximize subscriber engagement with the message. At operation 520, the STO processor 106 schedules individual messages to be sent to each of the respective subscribers at the determined future message send time for each of the respective subscribers. In embodiments, the STO processor 106 may send the determined future send time to one or more OMMs 350, which may handle scheduling, generating, and sending the messages to the respective subscribers. In various embodiments, the STO processor 106 (or the MS processor 105) receives indications of various interactions with the individual messages by the respective subscribers. The various interactions may include, for example, opening times for corresponding ones of the individual messages. In these embodiments, the STO processor 106 may update the STO ML model with additional time intervals between the determined future message send times and the opening times for the individual messages. At operation 525 process 500 ends or repeats as necessary.

FIG. 5 also shows various operations for generating the STO ML model, which corresponds to operation 510 of process 500. STO ML model generation process 510 begins at operation 530 where the STO processor 106 generates a user-message matrix (UMM) and a message-send time matrix (MSM). The UMM includes M×N elements, where M is a number of the respective subscribers and N is a number of sent messages of the previously sent messages. Each element in the UMM includes a value indicating an engagement with a corresponding one of the plurality of previously sent messages by a corresponding one of the respective users. In embodiments, a value of "1" in an element of the UMM indicates an engagement with a corresponding one of the plurality of previously sent messages, and a value of "0" in the UMM indicates a non-engagement with the corresponding one of the plurality of previously sent messages. The MSM includes N×L elements, where N is the number of sent messages and L is a number of the previous message send times. Each element in the MSM includes an engagement rate for a corresponding one of the previously sent messages at a corresponding one of the time intervals. In embodiments, L equals 24*7 or 168.

At operation 535, the STO processor 106 determines, from the UMM, K number of dimensional factors for all of the respective subscribers and all of the previously sent messages, and determines, from the MSM, P number of dimensional factors for all of the previously sent messages and all of the time intervals. In some embodiments, the STO processor 106 determines a configured size of the K number of dimensional factors; and/or determines a configured size of the P number of dimensional factors. In some embodiments, the STO processor 106 determines a size of the K number of dimensional factors and a size of the P number of dimensional factors based on a current or a previous computational resource utilization or consumption.

At operation 540, the STO processor 106 decomposes the UMM into a user factor matrix (UFM) including M×K elements and a first message factor matrix (MF1) including K×N elements, and at operation 545, the STO processor 106 decomposes the MSM into a second message factor matrix (MF2) including N×P elements and a sent time factor matrix (STF) including P×L elements. At operation 550, the STO processor 106 derives a prediction component based on the UFM, MF1, MF2, and STF. In various embodiments, where the prediction component is a prediction matrix, the STO processor 106 performs matrix multiplication on the UFM, the MF1, the MF2, and the STF to obtain a prediction matrix including M×L elements, each of the M×L elements including respective predicted engagement rates for the respective message send times. In some embodiments, the STO processor 106 calculates a product of the MF1 and the MF2 to obtain an inner product matrix having K×P elements. In these embodiments, after calculating the inner product matrix, the STO processor 106 calculates a product of the UFM, the inner product matrix, and the STF to obtain the prediction matrix. After operation 550, process 510 returns to process 500.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, for example, ORACLE®, DB2® by IBM®, and the like without departing from the scope of the implementations claimed.

It should also be understood that some of the disclosed implementations can be embodied in the form of various types of hardware, software, firmware, middleware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Python, PyTorch, NumPy, Ruby, Ruby on Rails, Scala, Smalltalk, Java™, C++, C#, "C", Rust, Go (or "Golang"), JavaScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Node.js, ASP.NET, JAMscript, Hypertext Markup Language (HTML), Extensible Markup Language (XML), wiki markup or Wikitext, Wireless Markup Language (WML), Java Script Object Notion (JSON), Apache® MessagePack™, Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Salesforce® Apex®, Salesforce® Visualforce®, Salesforce® Lightning®, Salesforce® Wave™ Dashboard Designer, Salesforce® Force.com® IDE, Android® Studio™ integrated development environment (IDE), Apple® iOS® software development kit (SDK), and/or any other programming language or development tools including proprietary programming languages and/or development tools. Furthermore, some or all of the software components or functions described herein can utilize a suitable querying language to query and store information in one or more databases or data structures, such as, for example, Structure Query Language (SQL), object query language (OQL), Salesforce® OQL (SOQL), Salesforce® object search language (SOSL), Salesforce® analytics query language (SAQL), and/or other query languages. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/ program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, includes a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable storage media (NTCRSM) comprising instructions for message send time predictions, wherein execution of the instructions is to cause a computing system to:
    generate a two-layer non-negative matrix factorization machine learning (ML) model for message send time optimization, and wherein generation of the ML model includes:
        generate a user-message matrix (UMM) including determine K number of dimensional factors for individual users of a service provider platform and corresponding ones of a plurality of previously sent messages, wherein the K number of dimensional factors is a configured number or the K number of dimensional factors is based on a current or previous computing resource consumption,
        generate a message-send time matrix (MSM) including determine P number of dimensional factors for the plurality of previously sent messages and time intervals between previous message send times and previous message interaction times for the corresponding ones of the plurality of previously sent messages, wherein the P number of dimensional factors is a configured number or the P number of dimensional factors based on the current or previous computing resource consumption, wherein a value of K is same as a value of P, or the value of K is different than the value of P,
        decompose the UMM into a user factor matrix (UFM) and a first message factor matrix (MF1),
        decompose the MSM into a second message factor matrix (MF2) and a sent time factor matrix (STF), and
        derive a prediction component based on the UFM, the MF1, the MF2, and the STF, wherein the prediction component includes predicted engagement rates for respective message send times for the individual users of the service provider platform, each of the predicted engagement rates for the respective message send times being based on the time intervals between the previous message send times and the previous message interaction times for the corresponding ones of the plurality of previously sent messages;
    determine a future message send time for each of the individual users based on the prediction component; and
    send individual messages to each of the individual users at the determined future message send time for each of the respective users.

2. The one or more NTCRSM of claim 1, wherein, to generate the ML model, execution of the instructions is to cause the computing system to:
    generate each matrix of the UMM and the UFM to have at least two dimensions that are directly related to one another.

3. The one or more NTCRSM of claim 1, wherein generation of the ML model further includes:
    generate the UMM to include M×N elements, wherein M is a number of the respective users and N is a number of sent messages in the plurality of previously sent messages, and each element in the UMM includes a value indicating an engagement with a corresponding one of the plurality of previously sent messages by a corresponding one of the respective users; and generate the MSM to include N×L elements, wherein N is the number of sent messages in the plurality of previously sent messages and L is a number of the previous message send times, and each element in the MSM includes an engagement rate for a corresponding one of the plurality of previously sent messages at a corresponding one of the time intervals.

4. The one or more NTCRSM of claim 3, wherein a value of "1" in an element of the UMM indicates the engagement with a corresponding one of the plurality of previously sent messages, and a value of "0" in the UMM indicates a non-engagement with the corresponding one of the plurality of previously sent messages.

5. The one or more NTCRSM of claim 3, wherein L equals 24*7 or 168.

6. The one or more NTCRSM of claim 1, wherein, to determine the K number of dimensional factors, execution of the instructions is to cause the computing system to:
determine a configured size of the K number of dimensional factors; or
determine a size of the K number of dimensional factors based on the current or previous computational resource consumption.

7. The one or more NTCRSM of claim 1, wherein, to determine the P number of dimensional factors, execution of the instructions is to cause the computing system to:
determine a configured size of the P number of dimensional factors; or
determine a size of the P number of dimensional factors based on the current or previous computational resource consumption.

8. The one or more NTCRSM of claim 1, wherein execution of the instructions is to cause the computing system to:
generate the ML model using non-negative matrix factorization.

9. The one or more NTCRSM of claim 1, wherein execution of the instructions is to cause the computing system to:
decompose the UMM into the UFM including M×K elements and the MF1 including K×N elements; and
decompose the MSM into the MF2 including N×P elements and the STF including P×L elements.

10. The one or more NTCRSM of claim 9, wherein execution of the instructions is to cause the computing system to:
perform matrix multiplication on the UFM, the MF1, the MF2, and the STF to obtain the prediction component including M×L elements, each of the M×L elements including respective predicted engagement rates for the respective message send times.

11. The one or more NTCRSM of claim 10, wherein, to perform the matrix multiplication, execution of the instructions is to cause the computing system to:
calculate a product of the MF1 and the MF2 to obtain an inner product matrix having K×P elements; and
after calculation of the inner product matrix, calculate a product of the UFM, the inner product matrix, and the STF to obtain the prediction component.

12. The one or more NTCRSM of claim 10, wherein execution of the instructions is to cause the computing system to:
receive indications of various interactions with the individual messages by the respective users, the various interactions including opening times for corresponding ones of the individual messages; and
update the ML model with additional time intervals, the additional time intervals being intervals between the determined future message send times and the opening times for the corresponding ones of the individual messages.

13. An apparatus to be implemented in a cloud computing service, the apparatus comprising:
a network interface; and
a processor system communicatively coupled with the network interface, the processor system to:
generate a two-layer non-negative matrix factorization machine learning (ML) model for message send time optimization, including a user-message matrix (UMM) and a message-send time matrix (MSM) wherein, to generate the ML model using non-negative matrix factorization, the processor system is to:
generate the UMM including determine K number of dimensional factors for individual users of a service provider platform and corresponding ones of a plurality of previously sent messages, wherein the K number of dimensional factors is a configured number or the K number of dimensional factors is based on a computing resource consumption, wherein the computing resource consumption is a current computing resource consumption or a previous computing resource consumption,
generate the MSM including determine P number of dimensional factors for the plurality of previously sent messages and time intervals between previous message send times and previous message interaction times for the corresponding ones of the plurality of previously sent messages, wherein the P number of dimensional factors is a configured number or the P number of dimensional factors based on the computing resource consumption, wherein a value of K is same as a value of P, or the value of K is different than the value of P,
decompose the UMM into a user factor matrix (UFM) and a first message factor matrix (MF1),
decompose the MSM into a second message factor matrix (MF2) and a sent time factor matrix (STF), and
derive a prediction component based on the UFM, the MF1, the MF2, and the STF, wherein the prediction component includes predicted engagement rates for respective message send times for the individual users of the service provider platform, each of the predicted engagement rates for the respective message send times being based on the time intervals between the previous message send times and the previous message interaction times for the corresponding ones of the plurality of previously sent messages;
determine a future message send time for each of the respective users based on the prediction component; and
send individual scheduling requests to one or more Outgoing Message Managers (OMMs), the individual scheduling requests to cause the one or more OMMs to schedule generating and transmission of individual messages to each of the respective users at the determined future message send time for each of the respective users.

14. The apparatus of claim 13, wherein for the generation of the ML model using non-negative matrix factorization, the processor system is to:
generate the UMM to include M×N elements, wherein M is a number of the respective users and N is a number of sent messages in the plurality of previously sent messages, and each element in the UMM includes a value indicating an engagement with a corresponding one of the plurality of previously sent messages by a corresponding one of the respective users; and
generate the MSM to include N×L elements, wherein N is the number of sent messages in the plurality of previously sent messages and L is a number of the previous message send times, and each element in the MSM includes an engagement rate for a corresponding one of the plurality of previously sent messages at a corresponding one of the time intervals.

15. The apparatus of claim 13, wherein, for the generation of the ML model using non-negative matrix factorization, the processor system is further to:
decompose the UMM into the UFM including M×k elements and the MF1 including K×N elements;
decompose the MSM into the MF2 including N×p elements and the STF including P×L elements; and
perform matrix multiplication on the UFM, the MF1, the MF2, and the STF to obtain a prediction component including M×L elements, each of the M×L elements including respective predicted engagement rates for the respective message send times, and, to perform the matrix multiplication, the processor system is to:
calculate a product of the MF1 and the MF2 to obtain an inner product matrix having k×p elements; and
after calculation of the inner product matrix, calculate a product of the UFM, the inner product matrix, and the STF to obtain the prediction component.

16. A method of predicting message send times for individual subscribers of a service provider platform, the method comprising:
generating, by a cloud computing service, a send time optimization (STO) model, wherein the STO model is a two-layer non-negative matrix factorization ML model, and generating the STO model comprises:
generating, by the cloud computing service, a user-message matrix (UMM) including determine K number of dimensional factors for individual subscribers of the service provider platform and corresponding ones of a plurality of previously sent messages, wherein the K number of dimensional factors is a configured number or the K number of dimensional factors is based on a current or previous computing resource consumption,
generating a message-send time matrix (MSM) including determine P number of dimensional factors for the plurality of previously sent messages and time intervals between previous message send times and previous message interaction times for the corresponding ones of the plurality of previously sent messages, wherein the P number of dimensional factors is a configured number or the P number of dimensional factors based on the current or previous computing resource consumption, wherein a value of K is same as a value of P, or the value of K is different than the value of P,
determining, by the cloud computing service, user factors from the UMM and message factors from the MSM,
decomposing, by the cloud computing service, the UMM into a user factor matrix (UFM) and a first message factor matrix (MF1),
decomposing, by the cloud computing service, the MSM into a second message factor matrix (MF2) and a sent time factor matrix (STF), and
deriving, by the cloud computing service, a prediction component based on the UFM, the MF1, the MF2, and the STF, wherein the prediction component includes predicted message send times for the individual subscribers to maximize engagement with respective messages, and each of the predicted message send times being based on the time intervals between the previous message send times and the previous message interaction times for the individual subscribers;
determining, by the cloud computing service, future message send times for the individual subscribers based on the prediction component;
scheduling, by the cloud computing service, individual messages to be sent to the individual subscribers at the determined future message send times; and
generating and sending, by the cloud computing service, the individual messages such that the individual messages arrive at a time that is same as the determined future message send times or within a time interval that includes the determined future message send times.

17. The method of claim 16, wherein generating the STO model comprises:
generating, by the cloud computing service, the UMM including M×N elements, wherein M is a number of the respective users and N is a number of sent messages in the plurality of previously sent messages, and each element in the UMM includes a value indicating an engagement with a corresponding one of the plurality of previously sent messages by a corresponding one of the respective users; and
generating, by the cloud computing service, the MSM including N×L elements, wherein N is the number of sent messages in the plurality of previously sent messages and L is a number of the previous message send times, and each element in the MSM includes an engagement rate for a corresponding one of the plurality of previously sent messages at a corresponding one of the time intervals.

18. The method of claim 16, wherein generating the STO model further comprises:
decomposing, by the cloud computing service, the UMM into the UFM including M×k elements and the MF1 including K×N elements;
decomposing, by the cloud computing service, the MSM into the MF2 including N×p elements and the STF including P×L elements; and
performing, by the cloud computing service, matrix multiplication on the UFM, the MF1, the MF2, and the STF to obtain a prediction matrix including M×L elements, each of the M×L elements including respective predicted engagement rates for the respective message send times, and performing the matrix multiplication comprises:
calculating a product of the MF1 and the MF2 to obtain an inner product matrix having k×p elements; and
calculating a product of the UFM, the inner product matrix, and the STF to obtain the prediction matrix.

* * * * *